US012634823B2

(12) United States Patent (10) Patent No.: US 12,634,823 B2
Gutman et al. (45) Date of Patent: May 19, 2026

(54) BLOCKER SENSING FOR WUR SELECTION

(71) Applicant: QUALCOMM Incorporated, San Diego, CA (US)

(72) Inventors: Igor Gutman, Hod HaSharon (IL); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 521 days.

(21) Appl. No.: 18/153,992

(22) Filed: Jan. 12, 2023

(65) Prior Publication Data

US 2024/0244528 A1 Jul. 18, 2024

(51) Int. Cl.
*H04W 52/02* (2009.01)
*H04B 17/318* (2015.01)

(52) U.S. Cl.
CPC ...... *H04W 52/0229* (2013.01); *H04B 17/318* (2015.01)

(58) Field of Classification Search
CPC ............ H04B 17/318; H04W 52/0229; H04W 52/0235; H04W 52/0245; Y02D 30/70
See application file for complete search history.

(56) References Cited

U.S. PATENT DOCUMENTS

2019/0191376 A1 6/2019 Kim et al.
2022/0201649 A1* 6/2022 Cox ..................... H04W 68/02

| | | | |
|---|---|---|---|
| 2024/0049138 A1* | 2/2024 | Cui ................... | H04W 52/0216 |
| 2024/0098644 A1* | 3/2024 | Ye ..................... | H04W 52/0216 |
| 2024/0107451 A1* | 3/2024 | Tiirola ................. | H04L 5/0007 |
| 2024/0155491 A1* | 5/2024 | Cheng ................. | H04W 52/0229 |
| 2024/0284334 A1* | 8/2024 | Hooli ................ | H04W 52/0219 |
| 2024/0397422 A1* | 11/2024 | Martin .............. | H04W 52/0235 |

FOREIGN PATENT DOCUMENTS

EP 4145915 A1 * 3/2023 ........ H04W 72/1273

OTHER PUBLICATIONS

International Search Report and Written Opinion—PCT/US2024/010349—ISA/EPO—May 16, 2024.

* cited by examiner

*Primary Examiner* — Phuc H Tran
(74) *Attorney, Agent, or Firm* — QUALCOMM Incorporated

(57) ABSTRACT

A method for wireless communication at a user equipment (UE) and related apparatus are provided. In the method, the UE measures the power of a transmission channel for communication between the UE and a network entity during a predetermined time window via a power detector of the UE. Based on the power of the transmission channel, the UE monitors for a wake-up signal (WUS) using a wake-up radio (WUR) or a main radio (MR). The WUS may or may not include a preamble. If the WUS includes a preamble, the UE monitors for the WUS based on the preamble. The method enables a UE to sense the power level associated with a WUS using a power detector, and use a radio that adapts better to the perceived power level (e.g., the WUR or the MR) to monitor for the WUS. Hence, it improves the power consumption efficiency of wireless communication.

28 Claims, 16 Drawing Sheets

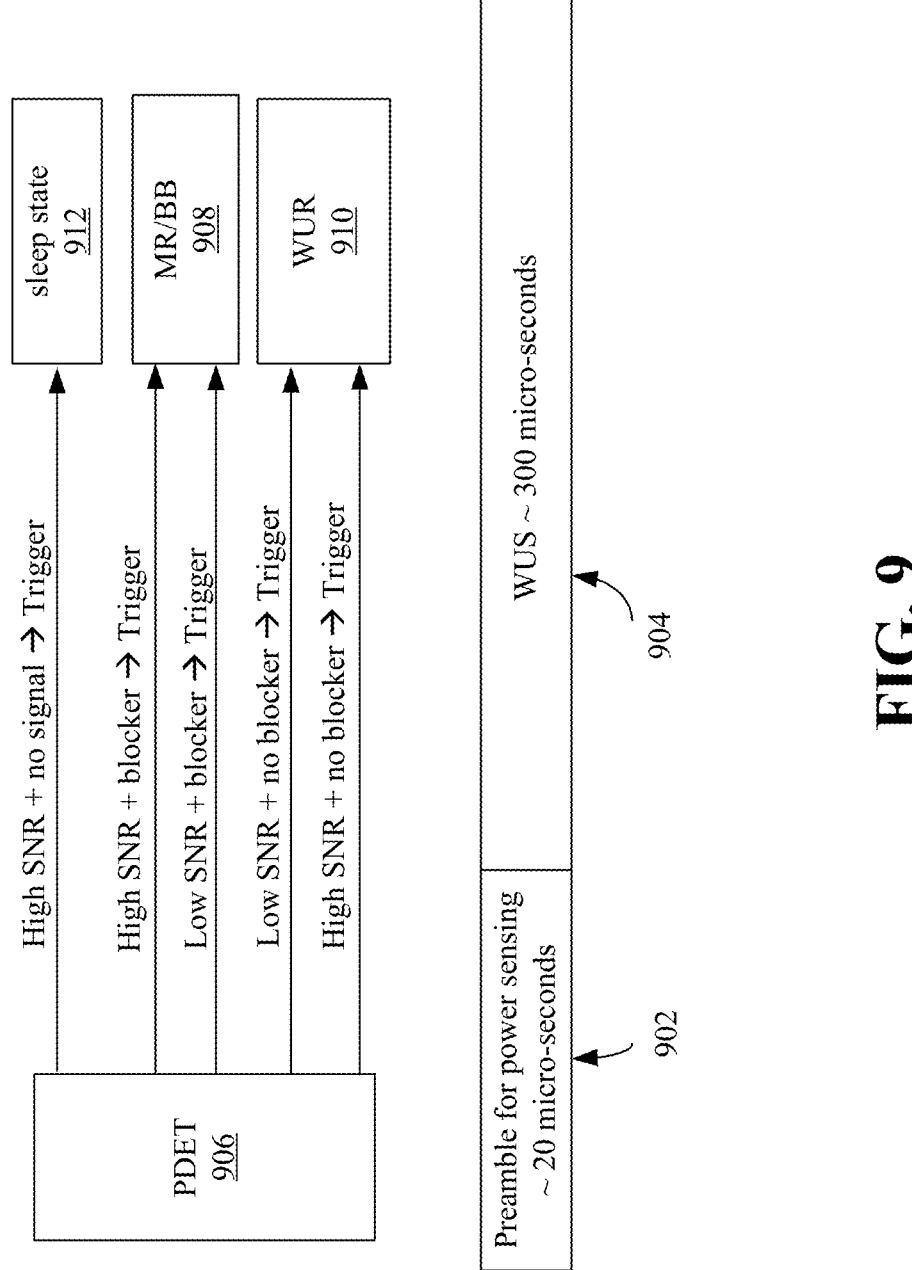
FIG. 9

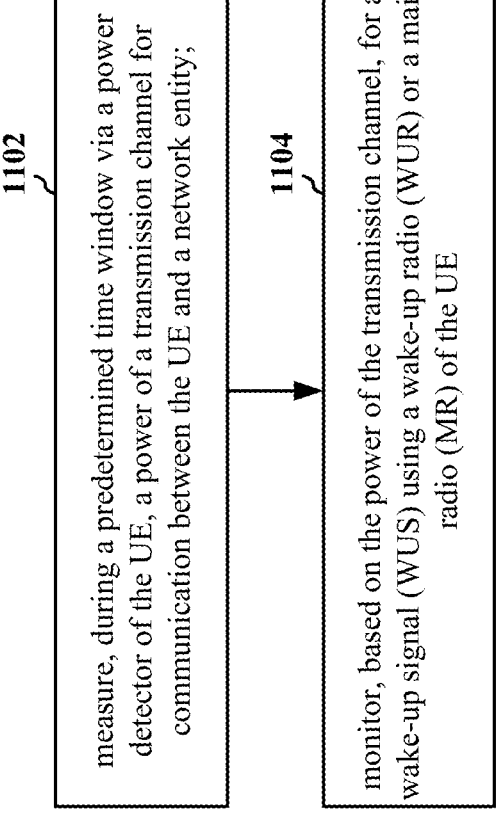
1102
measure, during a predetermined time window via a power detector of the UE, a power of a transmission channel for communication between the UE and a network entity;
1104
monitor, based on the power of the transmission channel, for a wake-up signal (WUS) using a wake-up radio (WUR) or a main radio (MR) of the UE
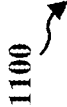
1100
FIG. 11

Figure 12:
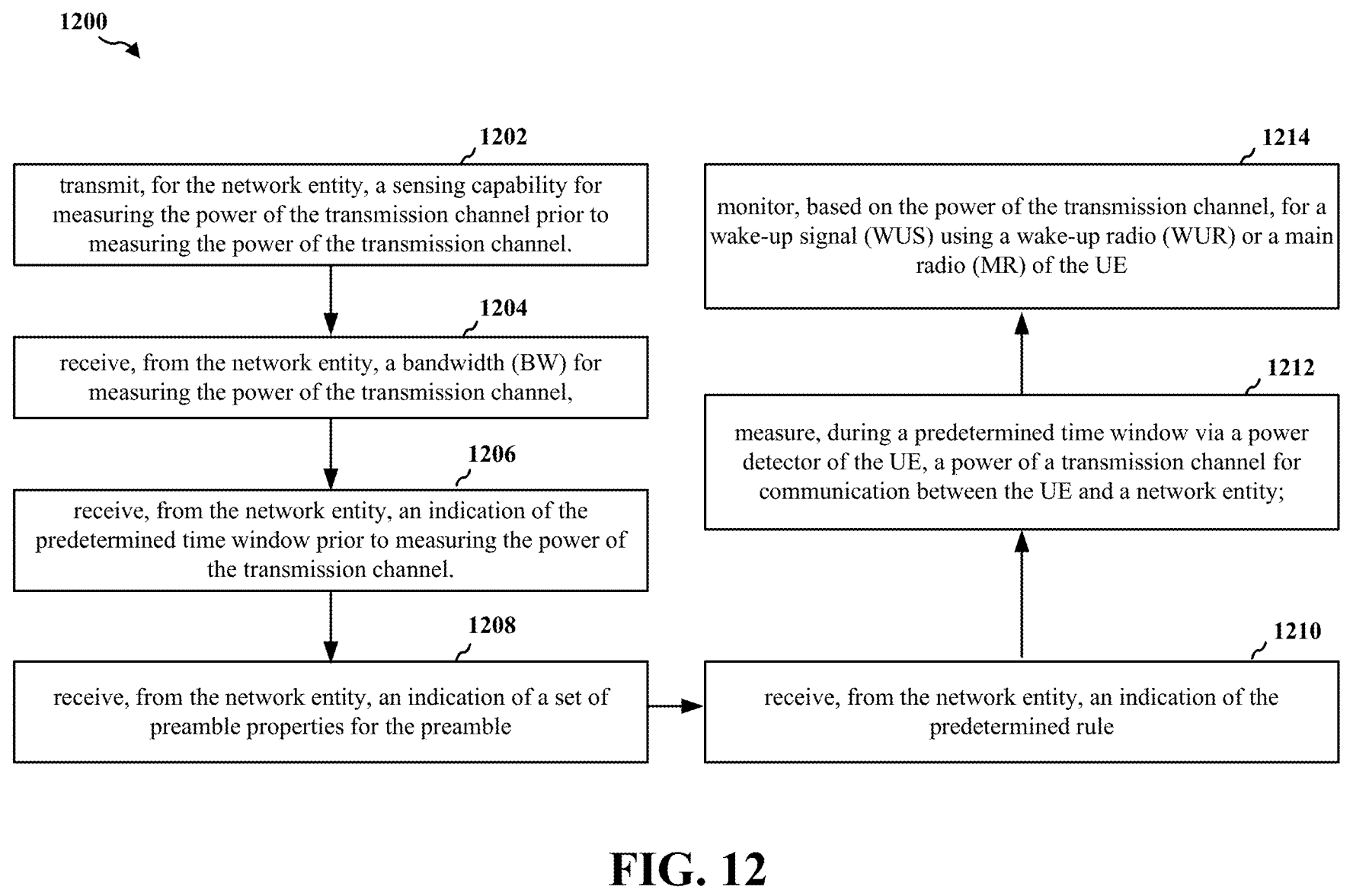

1200

1202 — transmit, for the network entity, a sensing capability for measuring the power of the transmission channel prior to measuring the power of the transmission channel.

1204 — receive, from the network entity, a bandwidth (BW) for measuring the power of the transmission channel, 1206 — receive, from the network entity, an indication of the predetermined time window prior to measuring the power of the transmission channel.

1208 — receive, from the network entity, an indication of a set of preamble properties for the preamble 1210 — receive, from the network entity, an indication of the predetermined rule 1212 — measure, during a predetermined time window via a power detector of the UE, a power of a transmission channel for communication between the UE and a network entity;

1214 — monitor, based on the power of the transmission channel, for a wake-up signal (WUS) using a wake-up radio (WUR) or a main radio (MR) of the UE

1302 receive, from a user equipment (UE), a sensing capability for measuring, during a predetermined time window, a power of a transmission channel for communication between the UE and the network entity

1304 transmit, for the UE, a wake-up signal (WUS) based on the power of the transmission channel, wherein the WUS is associated with a wake-up radio (WUR) or a main radio (MR) of the UE

BLOCKER SENSING FOR WUR SELECTION

TECHNICAL FIELD

The present disclosure relates generally to communication systems, and more particularly, to wireless communication with blocker sensing for wake-up radio (WUR) selection.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IOT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a user equipment (UE). The apparatus may include memory and at least one processor coupled to the memory. Based at least in part on information stored in the memory, the at least one processor may be configured to measure, during a predetermined time window via a power detector of the UE, a power of a transmission channel for communication between the UE and a network entity; and monitor, based on the power of the transmission channel, for a wake-up signal (WUS) using a WUR or a main radio (MR) of the UE.

In an aspect of the disclosure, a method, a computer-readable medium, and an apparatus are provided for wireless communication at a network entity. The apparatus may include memory and at least one processor coupled to the memory. Based at least in part on information stored in the memory, the at least one processor may be configured to receive, from a UE, a sensing capability for measuring, during a predetermined time window, a power of a transmission channel for communication between the UE and the network entity; and transmit, for the UE, a WUS based on the power of the transmission channel, where the WUS is associated with a WUR or an MR of the UE.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIGS. 6A and 6B are diagrams illustrating example WUR architectures.

FIG. 9 is a diagram illustrating an example use of a preamble in WUS search, in accordance with various aspects of the present disclosure.

FIG. 11 is the first flowchart illustrating methods of wireless communication at a UE in accordance with various aspects of the present disclosure.

FIG. 12 is the second flowchart illustrating methods of wireless communication at a UE in accordance with various aspects of the present disclosure.

DETAILED DESCRIPTION

Figure 1:
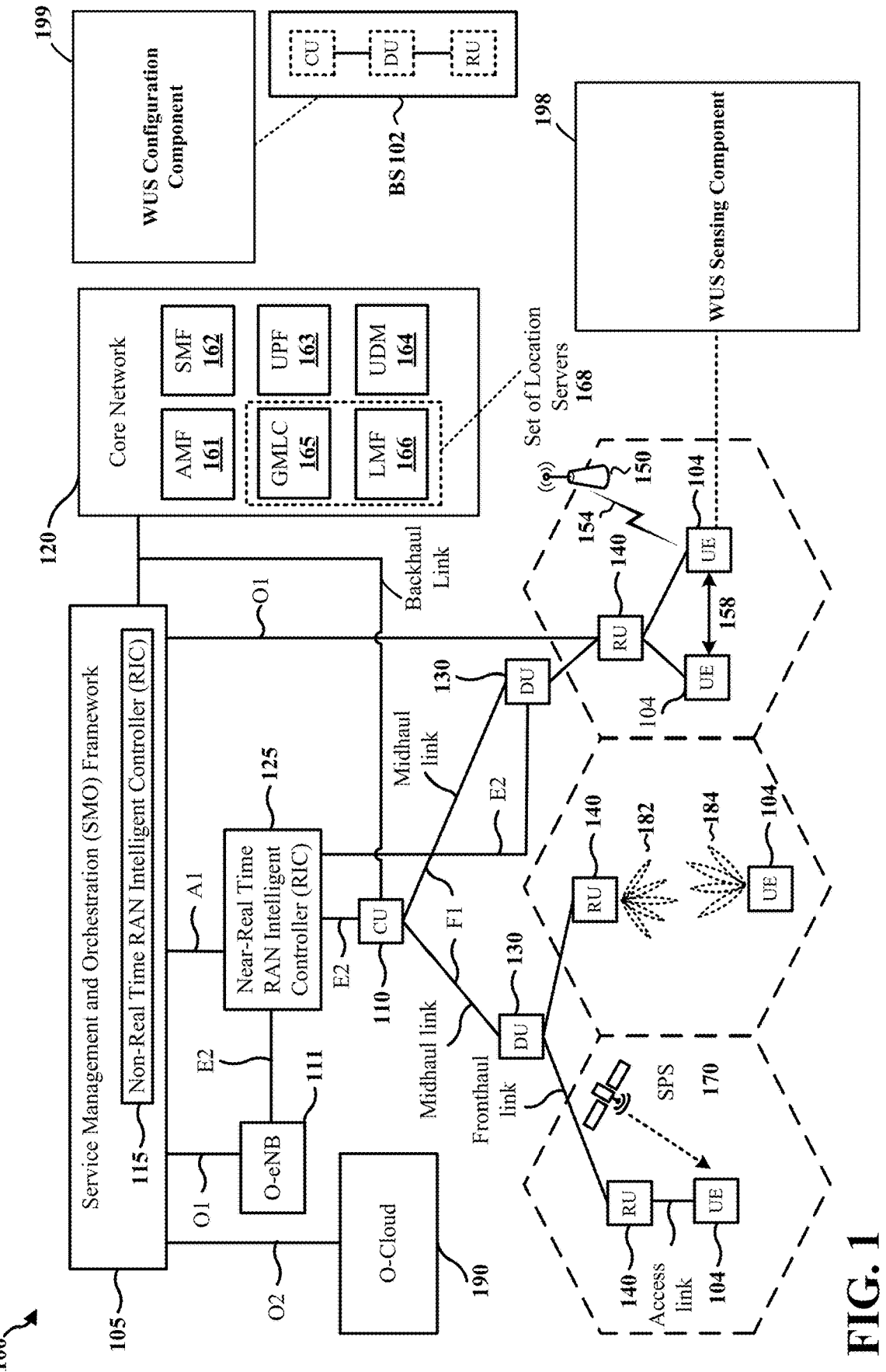
FIG. 1 is a diagram illustrating an example of a wireless communication system and an access network.

Various aspects relate generally to wireless communication with blocker sensing for WUR selection. Some aspects more specifically relate to methods and apparatus for WUS sensing. In some examples, a UE may measure, during a predetermined time window via a power detector of the UE, a power of a transmission channel for communication between the UE and a network entity; and monitor, based on the power of the transmission channel, for a WUS using a WUR or an MR of the UE. In some examples, a network entity may receive, from a UE, a sensing capability for measuring, during a predetermined time window, a power of a transmission channel for communication between the UE and the network entity; and transmit, for the UE, a WUS based on the power of the transmission channel, where the WUS is associated with a WUR or an MR of the UE.

Particular aspects of the subject matter described in this disclosure can be implemented to realize one or more of the following potential advantages. In some examples, by measuring, during a predetermined time window via a power detector of the UE, a power of a transmission channel for communication between the UE and a network entity; and monitoring for a WUS using a WUR or an MR of the UE based on the power of the transmission channel, the described techniques enable a UE to sense the power level associated with a WUS, and use a radio that adapts better to the perceived power level (e.g., the WUR or the MR) to monitor for the WUS. Hence, it improves the power consumption efficiency of wireless communication.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FP-GAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EE-PROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (IFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-cNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHZ (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHZ-7.125 GHZ) and FR2 (24.25 GHZ-52.6 GHZ). Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHZ. For example, three higher operating bands have been identified as frequency range designations FR2-2 (52.6 GHZ-71 GHZ), FR4 (71 GHZ-114.25 GHZ), and FR5

(114.25 GHZ-300 GHz). Each of these higher frequency bands falls within the EHF band.

With the above aspects in mind, unless specifically stated otherwise, the term "sub-6 GHz" or the like if used herein may broadly represent frequencies that may be less than 6 GHZ, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a WUS Sensing component 198. The WUS Sensing component 198 may be configured to measure, during a predetermined time window via a power detector of the UE, a power of a transmission channel for communication between the UE and a network entity; and monitor, based on the power of the transmission channel, for a WUS using a WUR or an MR of the UE. In certain aspects, the base station 102 may include an WUS Configuration component 199. The WUS Configuration component 199 may be configured to receive, from a UE, a sensing capability for measuring, during a predetermined time window, a power of a transmission channel for communication between the UE and the network entity; and transmit, for the UE, a WUS based on the power of the transmission channel, where the WUS is associated with a WUR or an MR of the UE. Although the following description may be focused on 5G NR, the concepts described herein may be applicable to other similar areas, such as LTE, LTE-A, CDMA, GSM, and other wireless technologies.

Figures 2A, 2B, 2C, 2D:
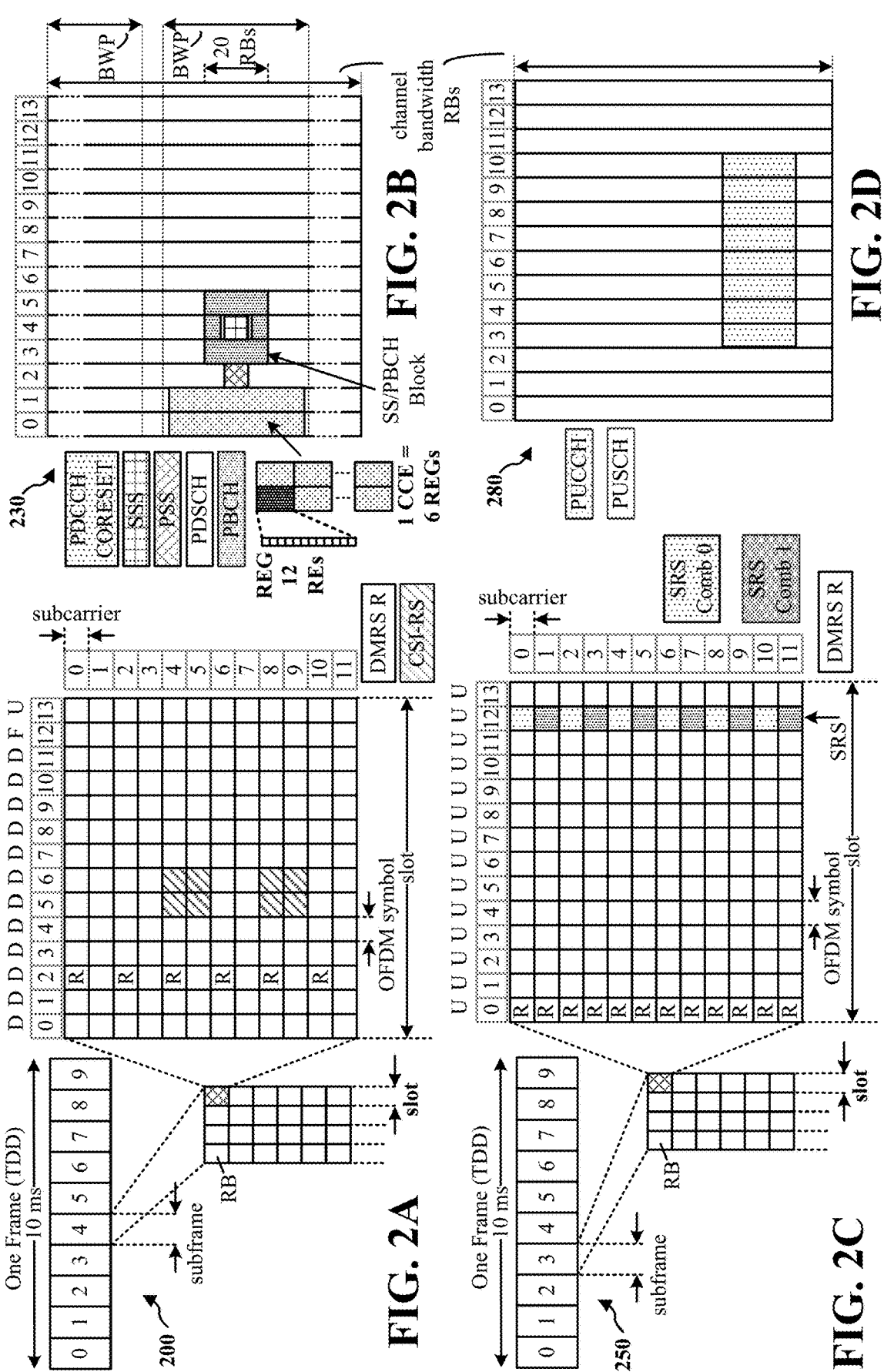
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

| Numerology, SCS, and CP | | |
| --- | --- | --- |
| $\mu$ | SCS $\Delta f = 2^{\mu} \cdot 15[\text{kHz}]$ | Cyclic prefix |
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology u, there are 14 symbols/slot and $2^{\mu}$ slots/subframe. The subcarrier spacing may be equal to $2^{\mu} * 15$ kHz, where u is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
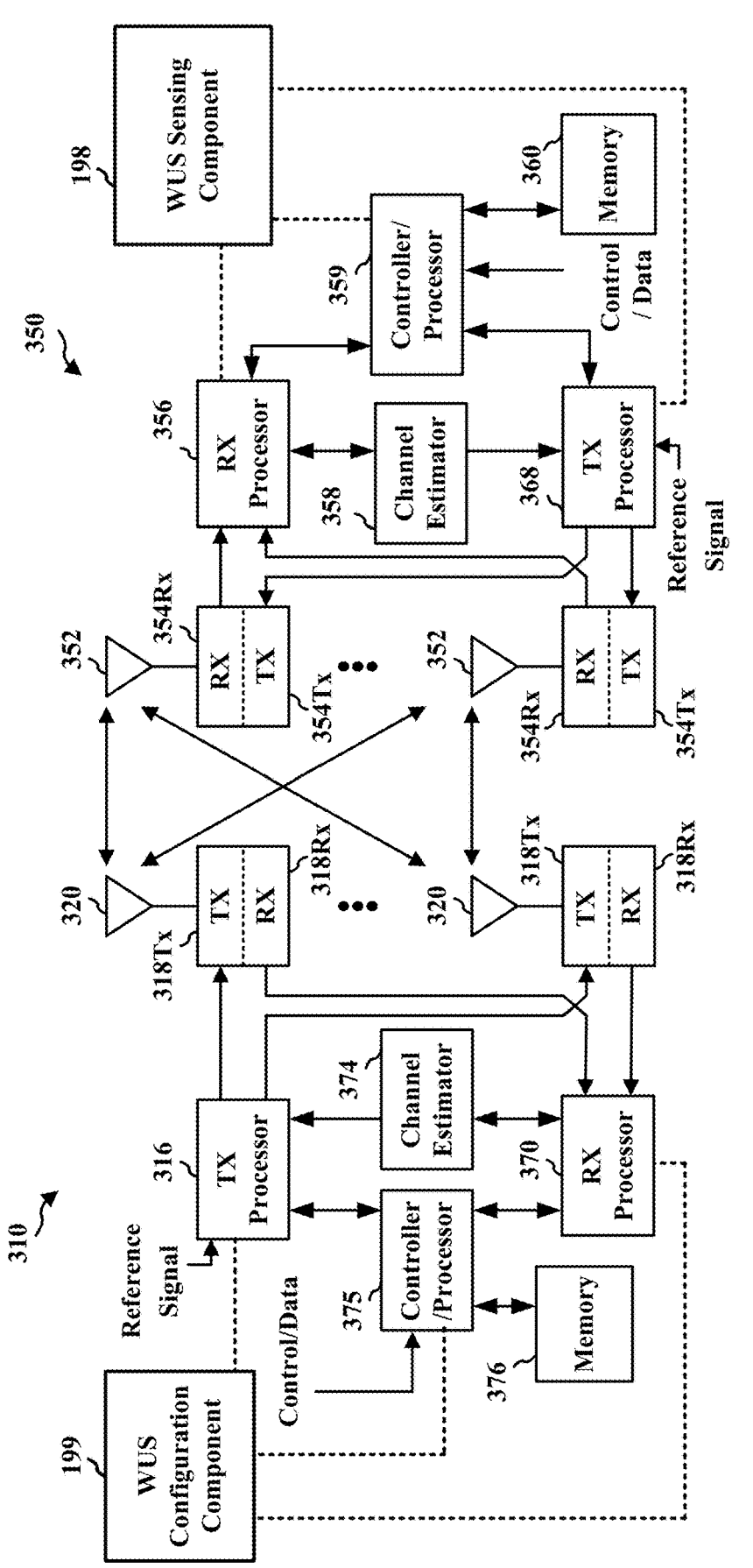
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the WUS Sensing component 198 of FIG. 1.

At least one of the TX processor 316, the RX processor 370, and the controller/processor 375 may be configured to perform aspects in connection with the WUS Configuration component 199 of FIG. 1.

In RRC idle and inactive states, radio resource management (RRM) and paging consume significant UE power. For example, in RRM, the UE periodically performs layer 3 reference signal received power (L3-RSRP) measurements on SSBs transmitted by a serving cell of the UE and neighbor cells of the UE. Such L3-RSPRP measurements consume power. In another example, in paging, the UE periodically monitors a paging occasion (PO) during each idle discontinuous reception (I-DRX) cycle. In a DRX mode, the UE may monitor a PDCCH channel discontinuously using a sleep and wake cycle, e.g., DRX OFF durations and DRX ON durations. When the UE is in an RRC-connected state, the DRX may also be referred to as Connected Mode DRX (C-DRX). If the UE is in an RRC idle state, the DRX may be referred to as I-DRX. In a non-DRX mode, the UE monitors for PDCCH in each subframe to check whether there is downlink data available. Continuous monitoring of the PDCCH uses more battery power at the UE, and DRX conserves battery power at the UE.

Figure 4:
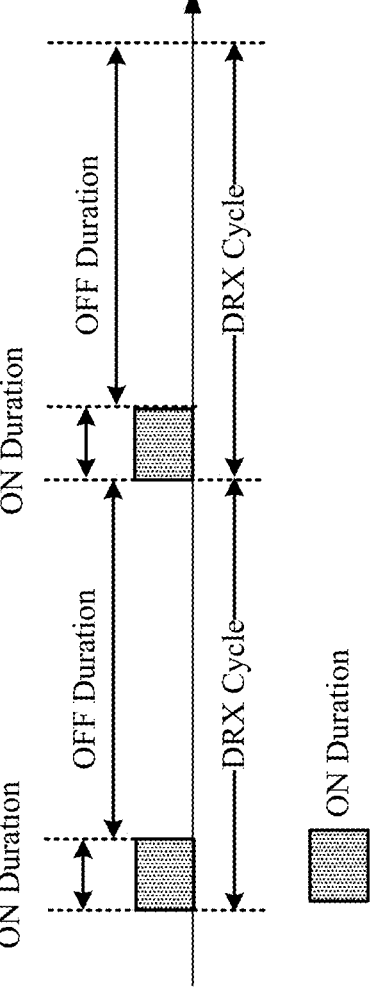
FIG. 4 is a diagram illustrating an example of a discontinuous reception (DRX) cycle in wireless communication.

FIG. 4 illustrates an example of a DRX cycle 400 including periodic ON durations during which the UE monitors for PDCCH and OFF durations during which the UE may not monitor for the PDCCH. The OFF duration may be referred to as a DRX opportunity, in some aspects. During the OFF duration, the UE does not monitor for PDCCH. The UE may enter a sleep mode or a low power mode in which the UE minimizes power consumption by shutting down an RF function without detecting communication from the base station.

The base station may send a WUS to a UE in advance of a PO when the base station will transmit communication to the UE. If the UE receives a WUS, the UE may wake-up by preparing to receive the communication during the PO. If the UE does not receive a WUS, the UE may return to the sleep mode. A UE may be configured with resources to monitor for the WUS. When configured with such resources, the UE wakes up a configurable amount of time before a start of a long DRX cycle and checks, e.g., monitors, for the WUS. If the UE does not receive the WUS, the UE returns to sleep for the next long DRX cycle. The use of WUS may help to reduce power consumption for UEs, e.g., by allowing the UE to return to the sleep mode without monitoring for additional signaling. In some configurations, a WUS may be transmitted over the PDCCH (such a wake-up signal may be referred to as a PDCCH-WUS).

Figure 5:
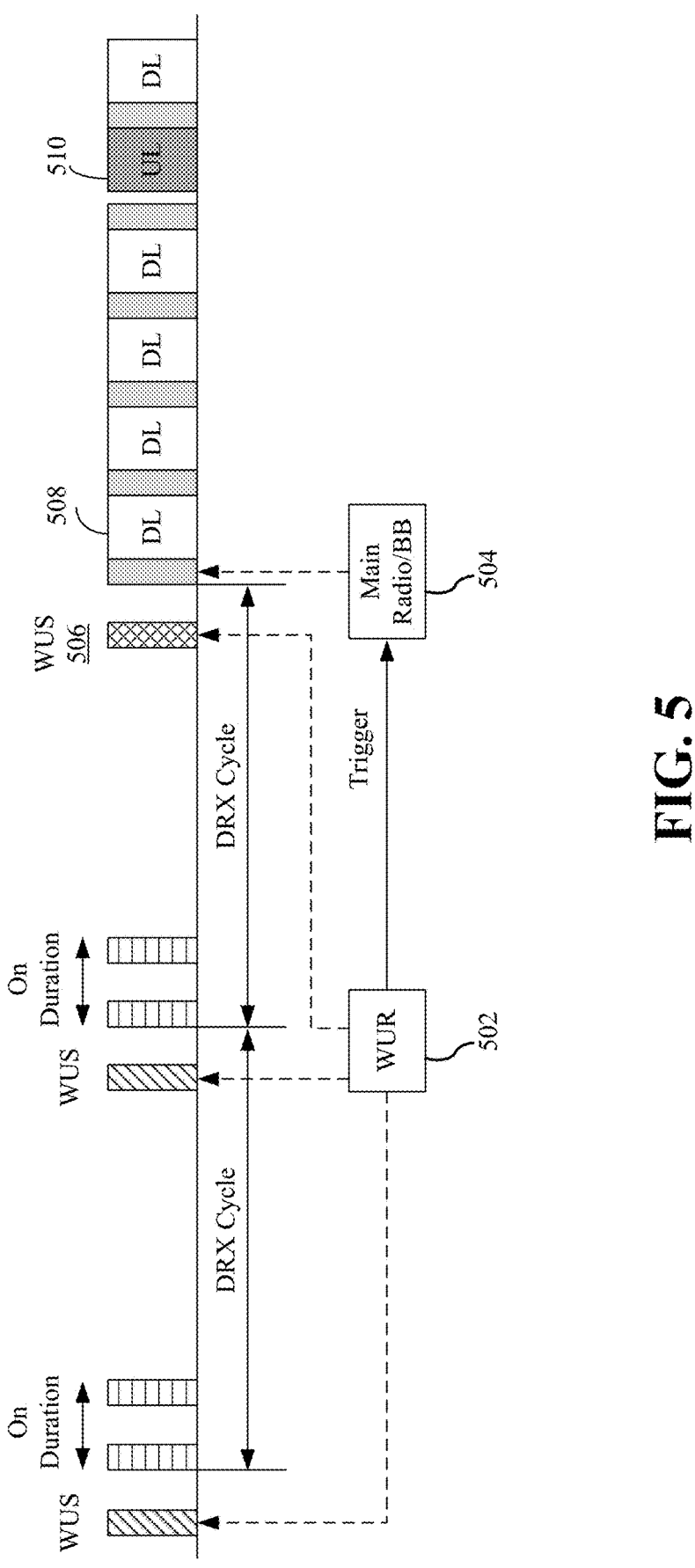
FIG. 5 is a diagram illustrating an example WUS search operation.

When there is no signalling/data traffic, the UE can go to sleep mode, and periodically wake up each DRX cycle, to search for existence of "potential" WUS using low power WUR. For a WUR to find the WUS, the WUS may be transmitted enough time before the transmission of the main traffic, and the WUS will then trigger the wake-up of the MR and the Baseband (BB) chip. FIG. 5 is a diagram 500 illustrating an example WUS search operation. As shown in FIG. 5, a WUR 502 may periodically monitor the existence of a WUS. If the WUR 502 detects a WUS (e.g., WUS 506), the WUR 506 may trigger the MR/BB chip 504 for the main traffic (e.g., DL data 508 and/or UL data 510). Since the WUS is defined as PDCCH, it may specify a power-hungry receiver. Additionally, conventional WUR/WUS design may face challenges in other areas, such as the MR and BB chip wake-up time, frequency tracking loop (FTL)/time tracking loop (TTL) warmup, and beam tracking. Various WUS/WUR solutions are studied in view of these challenges. Table 2 shows the challenges of WUR/WUS designs and potential solutions and strategies.

TABLE 2

| Main Challenge in WUR/WUS Design | | |
| --- | --- | --- |
| Challenge | Description | Solution/Strategy |
| Power Consumption | For each WUS search occasion, to consume the least possible power, while still maintain the operation conditions and blocker robustness | Low power/performance analog and digital WUR Power optimized False Alarm vs Missed Detection ratio (FA/MD) |
| Main radio and BB chip wake-up time | The maximum UE capability is about 3 ms | The network may schedule the grant within up to 15 ms Opportunistic/conditional vendor WUR strategy |
| FTL/TTL warm up | During the sleep, the oscillator may diverge, as FTL/TTL/Automatic Gain | Machine Learning (ML) approach for frequency offset |

TABLE 2-continued

| Main Challenge in WUR/WUS Design | | |
| --- | --- | --- |
| Challenge | Description | Solution/Strategy |
| | Control (AGC) loops are down (to avoid power consumption) | A-TRS |
| Beam tracking | During the sleep, the beam/module may change | Sweep per beam using multiple WUS repetitions |

In one example, a narrow band time domain sequence (similar to the on-off keying (OOK) based on binary sequences) may be used for the WUS. The narrow band time domain sequence may have similar distributions of "1" and "0," and the length of the sequence may be dictated by the number of UEs that the network should support and the specified processing gain. In order to keep the same numerology as in existing systems, the symbol length may be aligned, such that each bit will have the duration of a single OFDM symbol (e.g., for 120 KHz SCS, it would be about 112 kbps). The narrow band time domain sequence may have a low Peak-to-Average Power Ratio (PAPR).

Figures 6A, 6B:
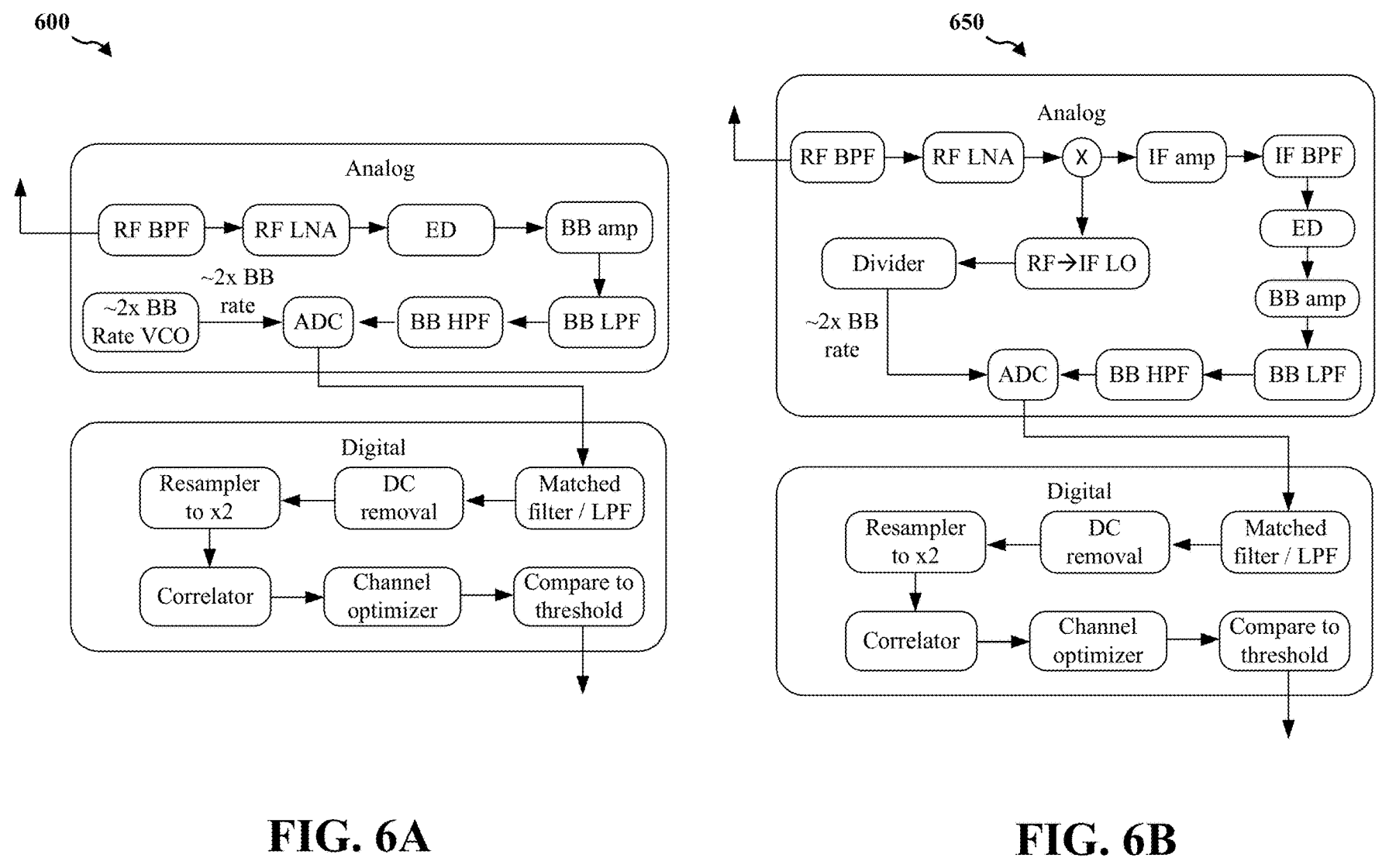

There are several WUR architectures that are very power efficient and consume a very small amount of power. FIG. 6A is a diagram 600 illustrating one example WUR architecture. As shown in FIG. 6A, a WUR architecture may be based on "direct RF" envelope detection. This WUR architecture, however, may be very sensitive to blockers (e.g., unintended signals with significant amounts of power), and the RF bandpass filter (BPF) in the WUR may suffer from poor Q factor. Therefore, adjacent blocker(s) (blocker that is adjacent to a WUS in the frequency domain) may "collapse" to the BB (or near BB) and adversely affect the sensing of the WUS. FIG. 6B is a diagram 650 illustrating another example WUR architecture. As shown in FIG. 6B, the WUR architecture may be based on an Intermediate Frequency first (IF First) design. In the "IF First" design, a signal may go to the intermediate filtering first, and then be filtered by IF BPF. The "IF First" WUR may consume much less power than the MR (e.g., about 1% of the power of the MR) and provide a good tradeoff between the False Alarm and Missed Detection ratio (FA/MD) in the absence of blockers. However, the Q factor of this design may not be as high as desired (compared to what could be achieved by BB digital/analog filtering). One main issue in the example WUR architectures described above is their sensitivity to blockers due to their limited dynamic ranges. The blockers may "collapse" to the BB due to the analog Envelop Detector (ED) and lack of sufficient Q factor of the analog filters, and adversely affect the WUS detection.

Figure 7:
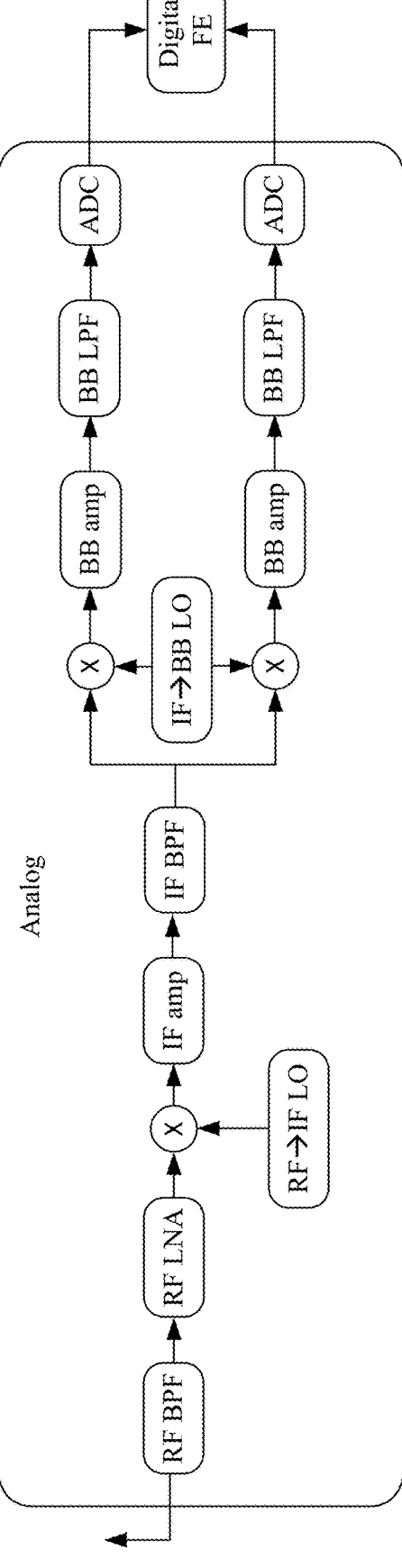
FIG. 7 is a diagram illustrating an example baseline (BB) receiver architecture.

The impact of blockers may be less severe in a "coherent" (baseline) receiver. FIG. 7 is a diagram 700 illustrating an example baseline receiver architecture. As shown in FIG. 7, compared to the receivers shown in FIGS. 6A and 6B, the baseline receiver may have double ADC, an additional local oscillator (LO) (e.g., the "IF to BB" LO). The baseline receiver may also have a higher dynamic range and the ability to large ADC oversampling (and therefore the ability to clean the blockers digitally). Hence, the baseline receiver may be more robust to the blockers. However, a baseline receiver may consume more power than the WUR receivers (in some examples, a baseline receiver may consume 100 times more power than a WUR). Hence, due to the power consideration, the baseline receiver may not be enabled constantly to monitor the WUS.

The present disclosure provides methods and apparatus for blocker sensing for WUR selection. Relevant network configurations and signaling are provided. In some aspects, a power detector (PDet) may be used to increase the blocker robustness for the WUS sensing while still maintaining low power consumption during the WUS search.

In some examples, the BB receiver or MR may be used when there are dominant adjacent blockers detected, for example, by the power detector, while the WUR may be used for the rest of the time. The power detector may be a wide band power detector and may be placed at the input to the antenna or some other locations, such as at the output of the IF BPF, to sense the channel to monitor whether there is a blocker that the WUR cannot handle. The power detector may be enabled for a limited time window prior to a potential WUS arrival. If the sensing shows a "clean" channel (e.g., no blocker is detected), then a WUR would be enabled. Otherwise, in case the measured power is larger than a threshold, which may indicate a blocker is detected, the MR/BB may be woke up for the WUS search. The MR/BB may consume more power but would be able to search for potential WUS even with the existence of a blocker.

Figure 8:
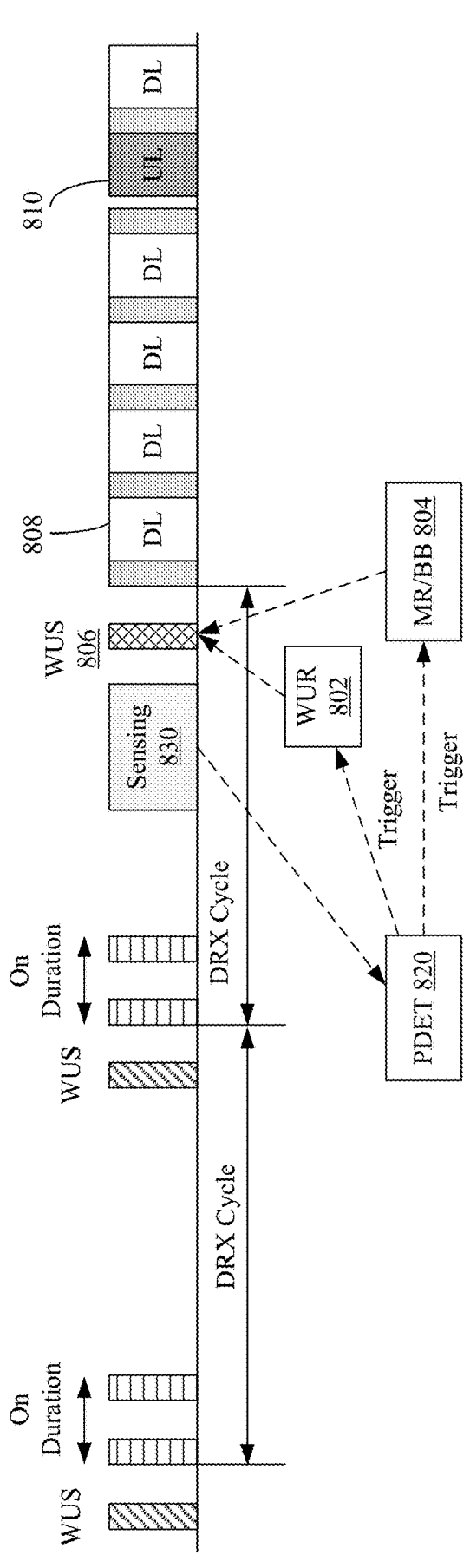
FIG. 8 is a diagram illustrating a WUS search operation with a power detector, in accordance with various aspects of the present disclosure.

FIG. 8 is a diagram 800 illustrating a WUS search operation with a power detector, in accordance with various aspects of the present disclosure. As shown in FIG. 8, a power detector PDet 820 may be used to monitor a block at, for example, the sensing window 830 (the time duration the power detector is turned ON). Depending on whether a blocker is detected, the power detector 820 may trigger the WUR 802 (if no blocker is detected) or the MR 804 (if a blocker is detected) to sense the WUS. If the WUS (e.g., WUS 806) is detected by the WUR 802 or the MR 804, the MR may be used for transmitting or receiving data of the main traffic (e.g., DL data 808 and/or UL data 810).

The accuracy of detecting the blocker may be related to factors such as the BW of the blocker and the time duration of the sensing window. The larger the BW of the blocker, the less time the power detector is needed to "sense" the channel under a given target accuracy, and less power would be used for the "sensing." Therefore, in some aspects, the UE may be signaled with the potential BW of the blocker, so that the tradeoff between the power consumption of the power detector and the accuracy of WUS searching may be optimized. In some examples, the network may signal the potential BW of the blocker to the UE through, for example, MAC-CE or RRC. For example, the network may signal to the UE that the BW of the blockers is 5 MHZ, or 10 MHz. In some aspects, the UE may signal the network regarding its sensing capability.

In some aspects, a "preamble" may be added to a WUS. Based on the preamble, a UE may have an option not to wake up the MR or the WUR at all, which may allow more power saving, as the UE may just spend power on sensing the preamble. In some examples, the WUS may have a sub-0 dB sensitivity. In those examples, the power detector may reliably detect the preamble in the regions with a high signal-to-noise ratio (SNR), but the reliability of the preamble detection may decrease in the regions with a low SNR, such as the edge regions of a network. Hence, the use of the preamble for WUS search may be related to the SNR of the regions. For example, a UE in high SNR regions may use the preamble for a certain percentage of the potential wake-ups and not to wake up the WUR. While in the rest of the time, the UE may also wake up the WUR to estimate (and update, if necessary) the SNR. FIG. 9 is a diagram 900 illustrating an example use of a preamble in WUS search, in accordance with various aspects of the present disclosure. In the example of FIG. 9, in order for the power detector to reliably detect the preamble, the "sensing time" for power sensing may be about 20 μs. Hence, the length of the preamble 902 for power sensing may be about 20 μs. In some examples, the WUS may have a BW in a range of 120-240 KHz, with the sequence length equivalent to about 36 OOK symbols (each symbol may be equivalent to the OFDM symbol with a length of about 9 μs). Hence, the WUS 904 (without the preamble) may have a length of about 300 μs. Therefore, adding a preamble for power detection may not consume significant resource, as a preamble 902 of about 20 μs accounts for about 6% of the length of the WUS 904 (about 300 μs).

With the preamble, the UE may decide whether to wake up the WUR or the MR based on the sensing of the preamble. When the SNR is high, in one example, if a preamble is detected (but no blocker is detected yet), the WUR may be triggered (woke up). The existence of a blocker may be based on the power level sensed by the power detector on the preamble. In another example, if a preamble is detected together with a blocker (e.g., the power sensed would be significantly larger than expected or what the WUR can handle), the UE may decide whether to wake up the MR. For example, referring to FIG. 9, when the power detector 906 detects a preamble together with a blocker in a high SNR environment, the power detector 906 may trigger the MR 908. In another example, if a preamble is not detected, the UE may remain in a sleep state without waking up the WUR or the MR. For example, referring to FIG. 9, when the power detector 906 does not detect a preamble in a high SNR environment, the UE may remain in a sleep state 912 without waking up the WUR 910 or the MR 908.

In some aspects, even when the SNR is high, the WUR may still be triggered periodically (the periodicity may be subject to UE implementation) in order to sense the existence of the OOK, as the SNR could be degraded irregularly. When the SNR is low or unknown, the UE may decide whether to wake up the WUR or the MR based on the sensing of the preamble. For example, based on a power level sensed based on the preamble, the UE may decide to wake up the MR (if the power level is larger than a power threshold) or the WUR (if the power level is less than or equal to the power threshold). For example, referring to FIG. 9, when the power detector 906 does not detect a blocker (e.g., the detected power level is less than or equal to the power threshold) in a low SNR environment, the UE may trigger the WUR 910. Otherwise, when the power detector 906 detects a blocker (e.g., the detected power level is greater than the power threshold) in a low SNR environment, the UE may trigger the MR 908.

In some aspects, the network may further negotiate with UE the preamble parameters/properties. The preamble parameter/properties may include, but not limited to, the preamble's pattern, periodicity, length, power (dBc), and BW. The periodicity of the preamble may specify the interval of the WUS that will be assigned a preamble. For example, the preamble may be assigned to every third or fourth WUS, depending on the periodicity. The contents of the preamble may be specified by the network and are not limited by this disclosure. For example, the contents of the preamble may be a signal that allows a UE to measure the power level based on the signal. Based on the measured power level, the UE may specify which radio (e.g., the WUR or MR) may be used to sense the WUS. Additionally, the network may signal to a UE the rule regarding the behavior of the UE when the preamble is not detected. For example, the rule may specify that the UE may remain in a sleep state and not wake up the WUR if no preamble is detected.

Figure 10:
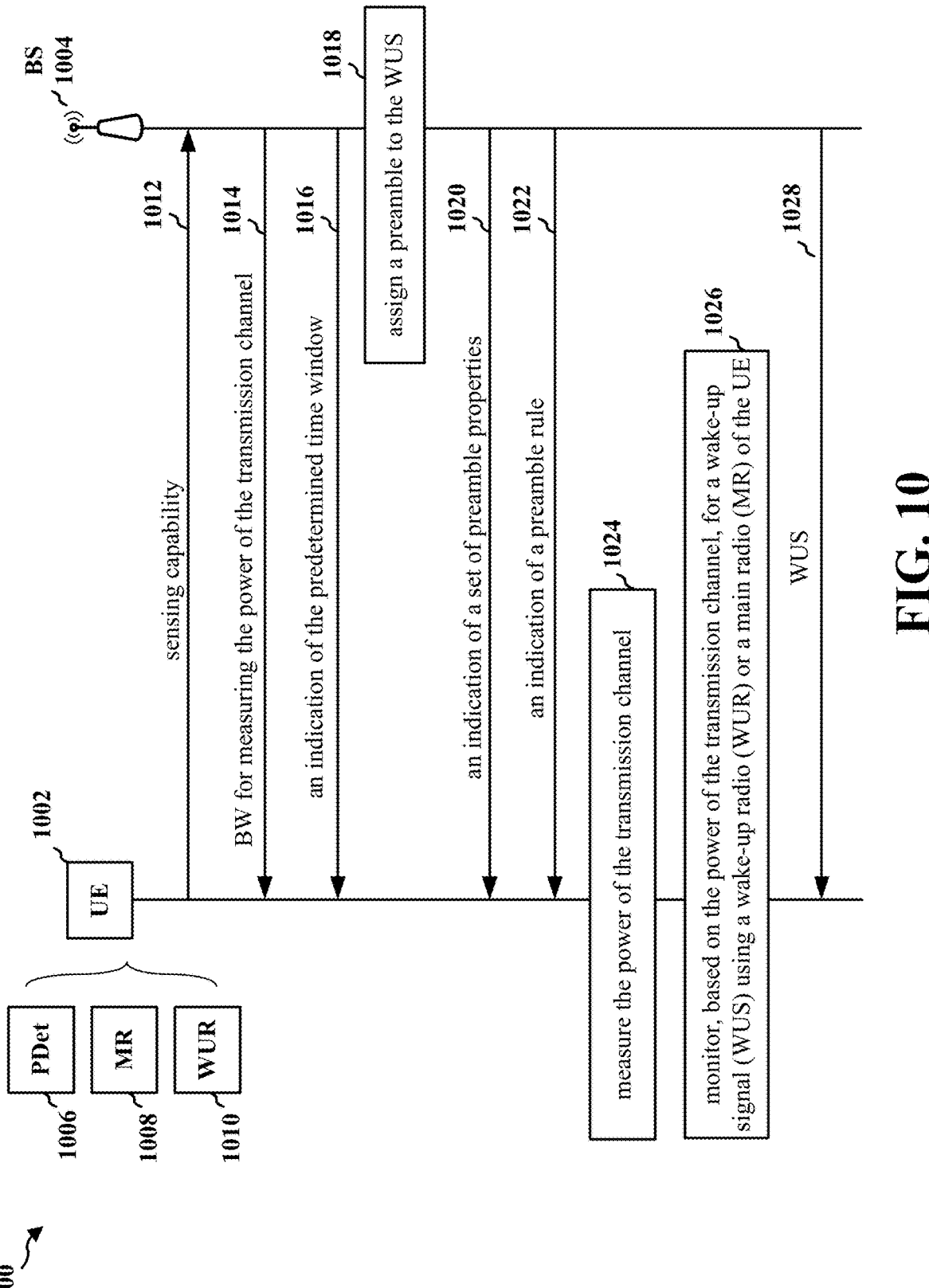
FIG. 10 is a call flow diagram illustrating a method of wireless communication in accordance with various aspects of the present disclosure.

FIG. 10 is a call flow diagram 1000 illustrating a method of wireless communication in accordance with various aspects of this present disclosure. Although aspects are described for a base station 1004, the aspects may be performed by a base station in aggregation and/or by one or more components of a base station 1004 (e.g., such as a CU 110, a DU 130, and/or an RU 140). As shown in FIG. 10, a UE 1002 may transmit a sensing capability to the base station 1004. The UE 1002 may include a power detector (PDet) 1006, an MR 1008, and a WUR 1010. The sensing capability may include, for example, the time duration and the power range the UE may sense.

At 1014, the UE 1002 may receive, from the base station 1004, a BW for measuring the power of the transmission channel.

At 1016, the UE 1002 may receive, from the base station 1004, an indication of the predetermined time window. For example, the predetermined time window may be the time window during which the UE may sense the power level of a signal, such as the length of the sensing window 830 in FIG. 8.

At 1018, the base station 1004 may assign a preamble to the WUS. For example, referring to FIG. 9, the base station may assign a preamble 902 to the WUS 904.

At 1020, the UE 1002 may receive, from the base station 1004, an indication of a set of preamble properties. For example, the set of preamble properties may include one or more of: a length of the preamble, a preamble power for the preamble, a preamble periodicity for the preamble, or a preamble bandwidth for the preamble.

At 1022, the UE 1002 may receive, from the base station 1004, an indication of a preamble rule. For example, the preamble rule may indicate the UE's behavior when a preamble with a certain power level is detected or when no preamble is detected.

At 1024, the UE 1002 may measure the power of the transmission channel. For example, referring to FIG. 8, the UE may use a power detector 820 to measure the power of the transmission channel at a sensing window 830.

At 1026, the UE 1002 may monitor, based on the power of the transmission channel, for a WUS using a WUR or an MR of the UE. For example, referring to FIG. 8, based on the power level measured by the power detector 820 in the sensing window 830, the UE may use the WUR 802 or the MR 804 to monitor a WUS (e.g., the WUS 806). In one example, if the power level is larger than a power threshold, the UE may use the MR 804 to monitor a WUS. If the power level is less than or equal to the power threshold, the UE may use the WUR 802 to monitor a WUS.

At 1028, the base station 1004 may transmit a WUS to the UE 1002.

FIG. 11 is a flowchart 1100 illustrating methods of wireless communication at a UE in accordance with various aspects of the present disclosure. The method may be performed by a UE. The UE may be the UE 104, 350, 1002, or the apparatus 1504 in the hardware implementation of FIG. 15. The method enables a UE to sense the power level associated with a WUS using a power detector, and use a radio that adapts better to the perceived power level (e.g., the WUR or the MR) to monitor for the WUS. The method improves the blocker robustness for WUS sensing without sacrificing power efficiency. Thus, it improves the power consumption efficiency of wireless communication.

As shown in FIG. 11, at 1102, the UE may measure, during a predetermined time window via a power detector of the UE, the power of a transmission channel for communication between the UE and a network entity. The network entity may be a base station, or a component of a base station, in the access network of FIG. 1 or a core network component (e.g., base station 102, 310, 1004; or the network entity 1502 in the hardware implementation of FIG. 15). FIGS. 8, 9, and 10 illustrate various aspects of the steps in connection with flowchart 1100. For example, referring to FIG. 8, the UE may measure, during a predetermined time window (the sensing window 830) via a power detector 820 of the UE, the power of a transmission channel for communication. Referring to FIG. 10, the UE 1002 may measure, at 1024, via a power detector 1006 of the UE 1002, the power of a transmission channel for communication between the UE 1002 and a network entity (base station 1004). Further, 1102 may be performed by the component 198.

At 1104, the UE may monitor, based on the power of the transmission channel, for a WUS using a WUR or an MR of the UE. For example, referring to FIG. 8, the UE may monitor, based on the power of the transmission channel, for a WUS (e.g., WUS 806) using a WUR 802 or an MR 804 of the UE. Referring to FIG. 10, the UE 1002 may monitor, at 1006, based on the power of the transmission channel (measured at 1024), for a WUS using a WUR 1010 or an MR 1008 of the UE 1002. Further, 1104 may be performed by the component 198.

FIG. 12 is a flowchart 1200 illustrating methods of wireless communication at a UE in accordance with various aspects of the present disclosure. The method may be performed by a UE. The UE may be the UE 104, 350, 1002, or the apparatus 1504 in the hardware implementation of FIG. 15. FIGS. 8, 9, and 10 illustrate various aspects of the steps in connection with flowchart 1200. The method enables a UE to sense the power level associated with a WUS using a power detector, to use a radio that adapts better to the perceived power level (e.g., the WUR or the MR) to monitor for the WUS. The method improves the blocker robustness for WUS sensing without sacrificing power efficiency. Thus, it improves the power consumption efficiency of wireless communication.

As shown in FIG. 12, at 1212, the UE may measure, during a predetermined time window via a power detector of the UE, a power of a transmission channel for communication between the UE and a network entity. The network entity may be a base station, or a component of a base station, in the access network of FIG. 1 or a core network component (e.g., base station 102, 310, 1004; or the network entity 1502 in the hardware implementation of FIG. 15). Step 1212 is similar to step 1102 of flowchart 1100. Relevant description in connection to flowchart 1100 may be referred to for details of step 1212, which are not repeatedly present herein for the sake of conciseness. Further, 1212 may be performed by the component 198.

At 1214, the UE may monitor, based on the power of the transmission channel, for a WUS using a WUR or an MR of the UE. Step 1214 is similar to step 1104 of flowchart 1100. Relevant description in connection to flowchart 1100 may be referred to for details of step 1214, which are not repeatedly present herein for the sake of conciseness. Further, 1214 may be performed by the component 198.

At 1204, the UE may receive, from the network entity, a BW for measuring the power of the transmission channel. When measuring the power of the transmission channel, the UE may measure the power of the transmission channel based on the BW. For example, referring to FIG. 10, the UE 1002 may receive, at 1014, from the network entity (base station 1004), a BW for measuring the power of the transmission channel. When the UE 1002 measures, at 1024, the power of the transmission channel, the UE 1002 may measure the power of the transmission channel based on the BW. Further, 1204 may be performed by the component 198.

At 1206, the UE may receive, from the network entity, an indication of the predetermined time window prior to being configured to measure the power of the transmission channel. For example, referring to FIG. 10, the UE 1002 may receive, at 1016, from the network entity (base station 1004), an indication of the predetermined time window prior to being configured to measure the power of the transmission channel. Referring to FIG. 8, the predetermined time window may be the length of sensing window 830. Further, 1206 may be performed by the component 198.

At 1202, the UE may transmit, for the network entity, a sensing capability for measuring the power of the transmission channel prior to being configured to measure the power of the transmission channel. For example, referring to FIG. 10, the UE 1002 may transmit, at 1012, for the network entity (base station 1004), a sensing capability for measuring the power of the transmission channel prior to being configured o measure the power of the transmission channel. Further, 1202 may be performed by the component 198.

In some aspects, to monitor for the WUS using the WUR or the MR of the UE, the UE may monitor, in response to the power of the transmission channel being greater than a power threshold, for the WUS using the MR; or monitor, in response to the power of the transmission channel being less than or equal to the power threshold, for the WUS using the WUR. For example, referring to FIG. 8, the UE may monitor, in response to the power of the transmission channel (sensed by the power detector 820 at the sensing window 830) being greater than a power threshold, for the WUS (e.g., WUS 806) using the MR 804; or monitor, in response to the power of the transmission channel being less than or equal to the power threshold, for the WUS (e.g., WUS 806) using the WUR 802.

In some aspects, the WUS may include a preamble. To monitor for the WUS, the UE may monitor for the WUS based on the preamble. For example, referring to FIG. 10, the base station 1004 may assign a preamble to the WUS at 1018. Referring to FIG. 9, a preamble 902 may be added to a WUS 904.

At 1208, the UE may receive, from the network entity, an indication of a set of preamble properties for the preamble. The set of preamble properties may include one or more of: a length of the preamble, a preamble power for the preamble, a preamble periodicity for the preamble, or a preamble bandwidth for the preamble. For example, referring to FIG. 10, the UE 1002 may receive, at 1020, from the network entity (base station 1004), an indication of a set of preamble properties for the preamble (which the base station 1004 assigned at 1018). Further, 1208 may be performed by the component 198. The set of preamble properties may include one or more of: a length of the preamble, a preamble power for the preamble, a preamble periodicity for the preamble, or a preamble bandwidth for the preamble.

In some aspects, to monitor for the WUS using the WUR or the MR, the UE may monitor, in response to the SNR of the transmission channel being unknown or less than a quality threshold, for the WUS using the WUR or the MR based on the preamble. For example, referring to FIG. 10, when monitoring for the WUS using the WUR or the MR (at 1026), the UE 1002 may monitor, in response to the SNR of the transmission channel being unknown or less than a quality threshold, for the WUS using the WUR or the MR based on the preamble.

In some aspects, to monitor for the WUS using the WUR or the MR based on the preamble, the UE may monitor, in response to the preamble indicating the power of the transmission channel is greater than a power threshold, for the WUS using the MR; or monitor, in response to the preamble indicating the power of the transmission channel is less than or equal to the power threshold, for the WUS using the WUR. For example, referring to FIG. 10, when the UE 1002 monitors, at 1026, for a WUS using a WUR or an MR, the UE 1002 may monitor the WUS based on the preamble. Referring to FIG. 9, when the SNR is low, the UE may monitor the WUS using the MR 908 when the preamble indicates the power of the transmission channel is greater than a power threshold (e.g., a blocker is detected). The UE may monitor the WUS using the WUR 910 when the preamble indicates the power of the transmission channel is less than or equal to the power threshold (e.g., no blocker is detected).

In some aspects, to monitor for the WUS using the WUR or the MR, the UE may monitor, in response to the SNR of the transmission channel being greater than the quality threshold, for the WUS using the WUR or the MR based on whether the preamble is detected. For example, referring to FIG. 9, when the SNR of the transmission channel is greater than the quality threshold (e.g., in a high SNR environment), the UE may monitor for the WUS using the WUR 910 or the MR 908 based on whether the preamble is detected.

In some aspects, to monitor for the WUS using the WUR or the MR based on whether the preamble is detected, the UE may monitor, in response to the preamble being detected and the power of the transmission channel being greater than a power threshold, for the WUS using the MR or the WUR; monitor, in response to the preamble being detected and the power of the transmission channel being less than or equal to the power threshold, for the WUS using the WUR; and operate, in response to the preamble not being detected, the WUR and the MR according to a predetermined rule. For example, referring to FIG. 9, the UE may monitor for the WUS using the WUR 910 when the SNR is high and the power of the transmission channel detected is less than or equal to the power threshold (e.g., no blocker detected).

At 1210, the UE may receive, from the network entity, an indication of the predetermined rule. For example, referring to FIG. 10, the UE 1002 may receive, at 1022, from the network entity (base station 1004), an indication of the predetermined rule. Further, 1210 may be performed by the component 198.

In some aspects, to operate the WUR and the MR according to the predetermined rule, the UE may maintain, in response to the preamble not being detected, a sleep state without waking up the WUR or the MR. For example, referring to FIG. 9, the UE may maintain, in response to the preamble not being detected, a sleep state 912 without waking up the WUR or the MR.

In some aspects, to monitor for the WUS using the WUR or the MR based on whether the preamble is detected, the UE may: periodically wake up the WUR according to a wake-up periodicity, where the wake-up periodicity is based on a determination by the network entity or the UE; and monitor for the WUS based on periodically waking up the WUR. For example, referring to FIG. 10, when the UE 1002 monitors for the WUS using the WUR 1010 or the MR 1008, the UE 1002 may periodically wake up the WUR 1010 according to a wake-up periodicity. The wake-up periodicity may be based on a determination by the network entity (base station 1004) or the UE 1002.

Figure 13:
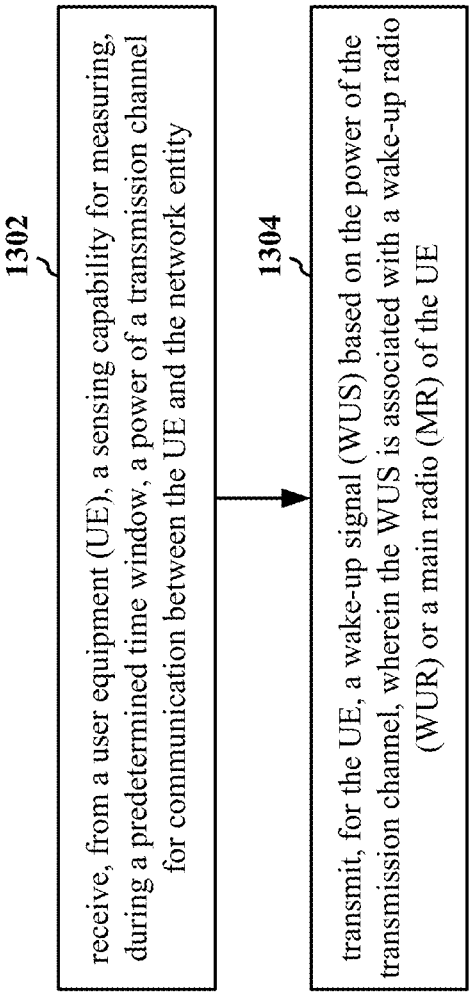
FIG. 13 is the first flowchart illustrating methods of wireless communication at a network entity in accordance with various aspects of the present disclosure.

FIG. 13 is a flowchart 1300 illustrating methods of wireless communication at a network entity in accordance with various aspects of the present disclosure. The method may be performed by a network entity. The network entity may be a base station, or a component of a base station, in the access network of FIG. 1 or a core network component (e.g., base station 102, 310, 1004; or the network entity 1502 in the hardware implementation of FIG. 15). The method enables a UE to sense the power level associated with a WUS using a power detector, and use a radio that adapts better to the perceived power level (e.g., the WUR or the MR) to monitor for the WUS. The method improves the blocker robustness for WUS sensing without sacrificing power efficiency. Thus, it improves the power consumption efficiency of wireless communication.

As shown in FIG. 13, at 1302, the network entity may receive, from a UE, a sensing capability for measuring, during a predetermined time window, a power of a transmission channel for communication between the UE and the network entity. The UE may be the UE 104, 350, 1002, or the apparatus 1504 in the hardware implementation of FIG. 15. FIGS. 8, 9, and 10 illustrate various aspects of the steps in connection with flowchart 1300. For example, referring to FIG. 10, the network entity (base station 1004) may receive, at 1012, from a UE 1002, a sensing capability for measuring a power of a transmission channel for communication between the UE 1002 and the network entity (base station 1004) during a predetermined time window. Referring to FIG. 8, in one example, the predetermined time window may be the sensing window 830. Further, 1302 may be performed by the component 199.

At 1304, the network entity may transmit, for the UE, a WUS based on the power of the transmission channel. The WUS may be associated with a WUR or an MR of the UE. For example, referring to FIG. 10, the network entity (base station 1004) may transmit, at 1028, for the UE 1002, a WUS based on the power of the transmission channel. Further, 1304 may be performed by the component 199.

Figure 14:
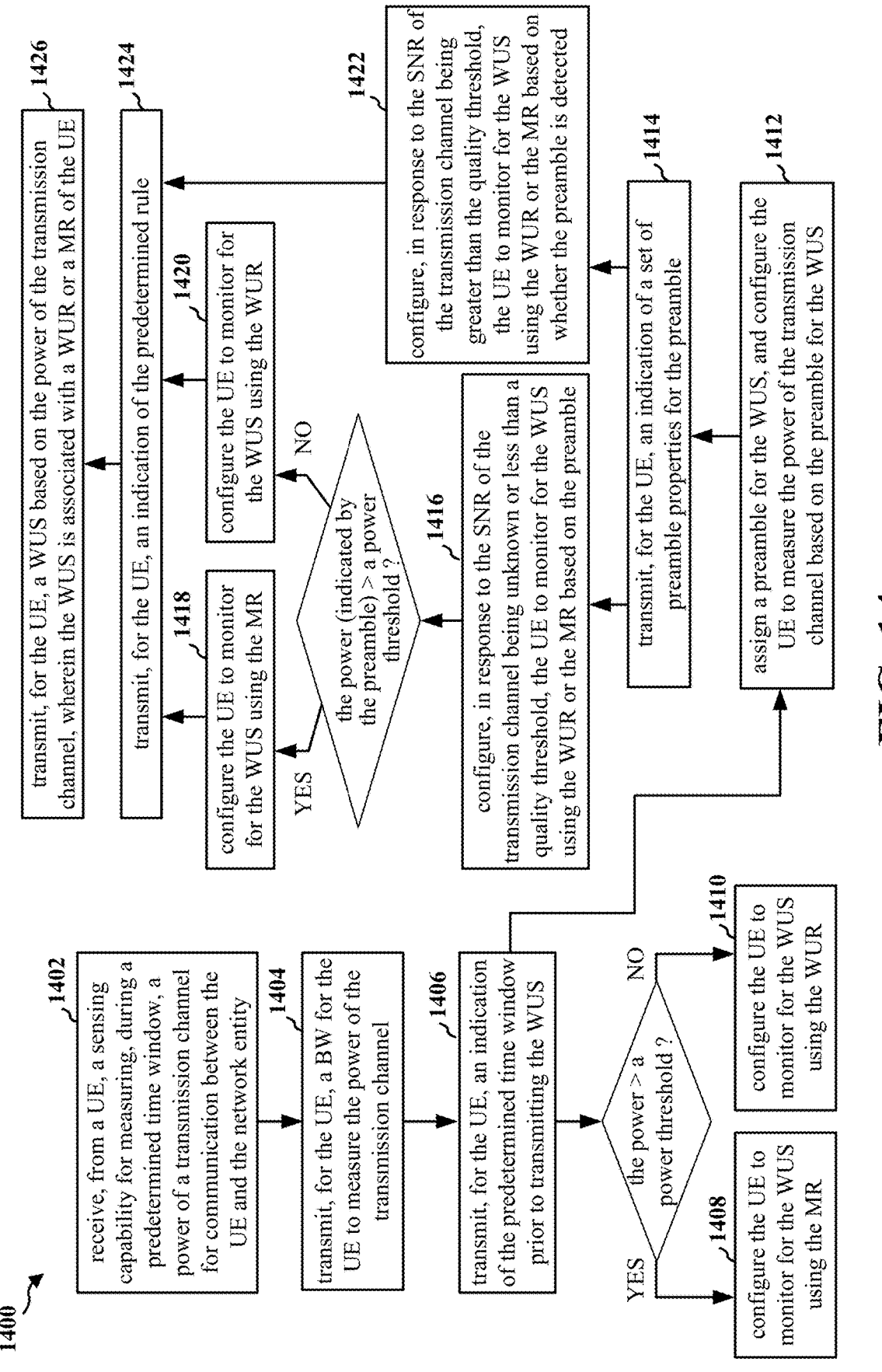
FIG. 14 is the second flowchart illustrating methods of wireless communication at a network entity in accordance with various aspects of the present disclosure.

FIG. 14 is a flowchart 1400 illustrating methods of wireless communication at a network entity in accordance with various aspects of the present disclosure. The method may be performed by a network entity. The network entity may be a base station, or a component of a base station, in the access network of FIG. 1 or a core network component (e.g., base station 102, 310, 1004; or the network entity 1502 in the hardware implementation of FIG. 15). FIGS. 8, 9, and 10 illustrate various aspects of the steps in connection with flowchart 1400. The method enables a UE to sense the power level associated with a WUS using a power detector, and use a radio that adapts better to the perceived power level (e.g., the WUR or the MR) to monitor for the WUS. The method improves the blocker robustness for WUS sensing without sacrificing power efficiency. Thus, it improves the power consumption efficiency of wireless communication.

As shown in FIG. 14, at 1402, the network entity may receive, from a UE, a sensing capability for measuring, during a predetermined time window, a power of a transmission channel for communication between the UE and the network entity. The UE may be the UE 104, 350, 1002, or the apparatus 1504 in the hardware implementation of FIG. 15. Step 1402 is similar to step 1302 of flowchart 1300. Relevant description in connection to flowchart 1300 may be referred to for details of step 1402, which are not repeatedly present herein for the sake of conciseness. Further, 1402 may be performed by the component 199.

At 1426, the network entity may transmit, for the UE, a WUS based on the power of the transmission channel. The WUS may be associated with a WUR or an MR of the UE. Step 1426 is similar to step 1304 of flowchart 1300. Relevant description in connection to flowchart 1300 may be referred to for details of step 1426, which are not repeatedly present herein for the sake of conciseness. Further, 1426 may be performed by the component 199.

At 1404, the network entity may transmit, for the UE, a BW for the UE to measure the power of the transmission channel. For example, referring to FIG. 10, the network entity (base station 1004) may transmit, at 1014, to the UE 1002, a BW for measuring the power of the transmission channel. Further, 1404 may be performed by the component 199.

At 1406, the network entity may transmit, for the UE, an indication of the predetermined time window prior to transmitting the WUS. For example, referring to FIG. 10, the network entity (base station 1004) may transmit, at 1016, for the UE 1002, an indication of the predetermined time window prior to transmitting the WUS (at 1028). Referring to FIG. 8, the predetermined time window may be the length of sensing window 830. Further, 1406 may be performed by the component 199.

At 1408, if the power of the transmission channel is greater than a power threshold, the network entity may configure the UE to monitor for the WUS using the MR. At 1410, if the power of the transmission channel is less than or equal to the power threshold, the network entity may configure the UE to monitor for the WUS using the WUR. For example, referring to FIG. 10, the network entity (base station 1004) may configure the UE 1002 to monitor, at 1026, for the WUS using the MR 1008 or the WUR 1010 based on the power of the transmission channel (which the UE 1002 measured at 1024). Further, 1408 may be performed by the component 199.

At 1412, the network entity may assign a preamble for the WUS, and configure the UE to measure the power of the transmission channel based on the preamble for the WUS. For example, referring to FIG. 10, the base station 1004 may assign a preamble to the WUS at 1018. When the UE 1002 measures the power of the transmission channel at 1024, the UE 1002 may measure the power of the transmission channel based on the preamble. Referring to FIG. 9, an example preamble 902 may be added to a WUS 904. Further, 1412 may be performed by the component 199.

At 1414, the network entity may transmit, for the UE, an indication of a set of preamble properties for the preamble. The set of preamble properties may include one or more of: a length of the preamble, a preamble power for the preamble, a preamble periodicity for the preamble, or a preamble bandwidth for the preamble. For example, referring to FIG. 10, the network entity (base station 1004) may transmit, at 1020, to the UE 1002, an indication of a set of preamble properties for the preamble (which the base station 1004 assigned at 1018). Further, 1414 may be performed by the component 199. The set of preamble properties may include one or more of: a length of the preamble, a preamble power for the preamble, a preamble periodicity for the preamble, or a preamble bandwidth for the preamble.

At 1416, the network entity may configure, in response to the SNR of the transmission channel being unknown or less than a quality threshold, the UE to monitor for the WUS using the WUR or the MR based on the preamble. For example, referring to FIG. 10, the network entity (base station 1004) may configure, in response to the SNR of the transmission channel being unknown or less than a quality threshold, the UE 1002 to monitor, at 1026, for the WUS using the WUR 1010 or the MR 1008 based on the preamble. Referring to FIG. 9, if the SNR of the transmission channel being unknown or less than a quality threshold (e.g., Low SNR), the network entity may configure the UE to monitor for the WUS using the WUR 910 or the MR 908 based on the preamble 902. Further, 1416 may be performed by the component 199.

At 1418, the network entity may configure, in response to the preamble indicating the power of the transmission channel is greater than a power threshold, the UE to monitor for the WUS using the MR. At 1420, the network entity may configure, in response to the preamble indicating the power of the transmission channel is less than or equal to the power threshold, the UE to monitor for the WUS using the WUR. For example, referring to FIG. 9, when the preamble 902 indicates the power of the transmission channel is greater than a power threshold (e.g., a blocker is detected), the network entity may configure the UE to monitor for the WUS using the MR 908. When the preamble 902 indicates the power of the transmission channel is less than or equal to the power threshold (e.g., no blocker is detected), the network entity may configure the UE to monitor for the WUS using the WUR 910. Further, 1418 may be performed by the component 199.

At 1422, the network entity may configure, in response to the SNR of the transmission channel being greater than the quality threshold, the UE to monitor for the WUS using the WUR or the MR based on whether the preamble is detected. For example, referring to FIG. 9, when the SNR of the transmission channel is greater than the quality threshold (e.g., "High SNR" scenarios), the network entity may configure the UE to monitor for the WUS using the WUR 910 or the MR 908 based on whether the preamble is detected. Further, 1422 may be performed by the component 199.

In some aspects, to configure the UE to monitor for the WUS using the WUR or the MR based on whether the preamble is detected, the network entity may configure, in response to the preamble being detected and the power of the transmission channel being greater than a power threshold, the UE to monitor for the WUS using the WUR or the MR; configure, in response to the preamble being detected and the power of the transmission channel being less than or equal to the power threshold, the UE to monitor for the WUS using the WUR; and configure, in response to the preamble not being detected, the UE to operate the WUR and the MR according to a predetermined rule. For example, referring to FIG. 9, when the preamble 902 is detected and the power of the transmission channel is greater than a power threshold, the network entity may configure the UE to monitor for the WUS using the WUR 910 or the MR 908. When the preamble is detected and the power of the transmission channel is less than or equal to the power threshold (e.g., no blocker is detected), the network entity may configure the UE to monitor for the WUS using the WUR 910. When the preamble 902 is not detected, the UE may operate the WUR and the MR according to a predetermined rule (e.g., the UE may remain in a sleep state 912).

At 1424, the network entity may transmit, for the UE, an indication of the predetermined rule. For example, referring to FIG. 10, the network entity (base station 1004) may transmit, at 1022, for the UE 1002, an indication of the predetermined rule. Further, 1424 may be performed by the component 199.

In some aspects, to configure the UE to operate the WUR and the MR according to the predetermined rule, the network entity may configure, in response to the preamble not being detected, the UE to maintain a sleep state without waking up the WUR or the MR. For example, referring to FIG. 9, when the preamble 902 is not detected, the network entity may configure the UE to maintain a sleep state 912 without waking up the WUR 910 or the MR 908.

In some aspects, to configure the UE to monitor for the WUS using the WUR or the MR based on whether the preamble is detected, the network entity may: configure the UE to periodically wake up the WUR to monitor for the WUS according to a wake-up periodicity. The wake-up periodicity may be based on a determination by the network entity or the UE. For example, referring to FIG. 10, when the UE 1002 monitors for the WUS using the WUR 1010 or the MR 1008, the network entity (base station 1004) may configure the UE 1002 to periodically wake up the WUR 1010 according to a wake-up periodicity. The wake-up periodicity may be based on a determination by the network entity (base station 1004) or the UE 1002.

Figure 15:
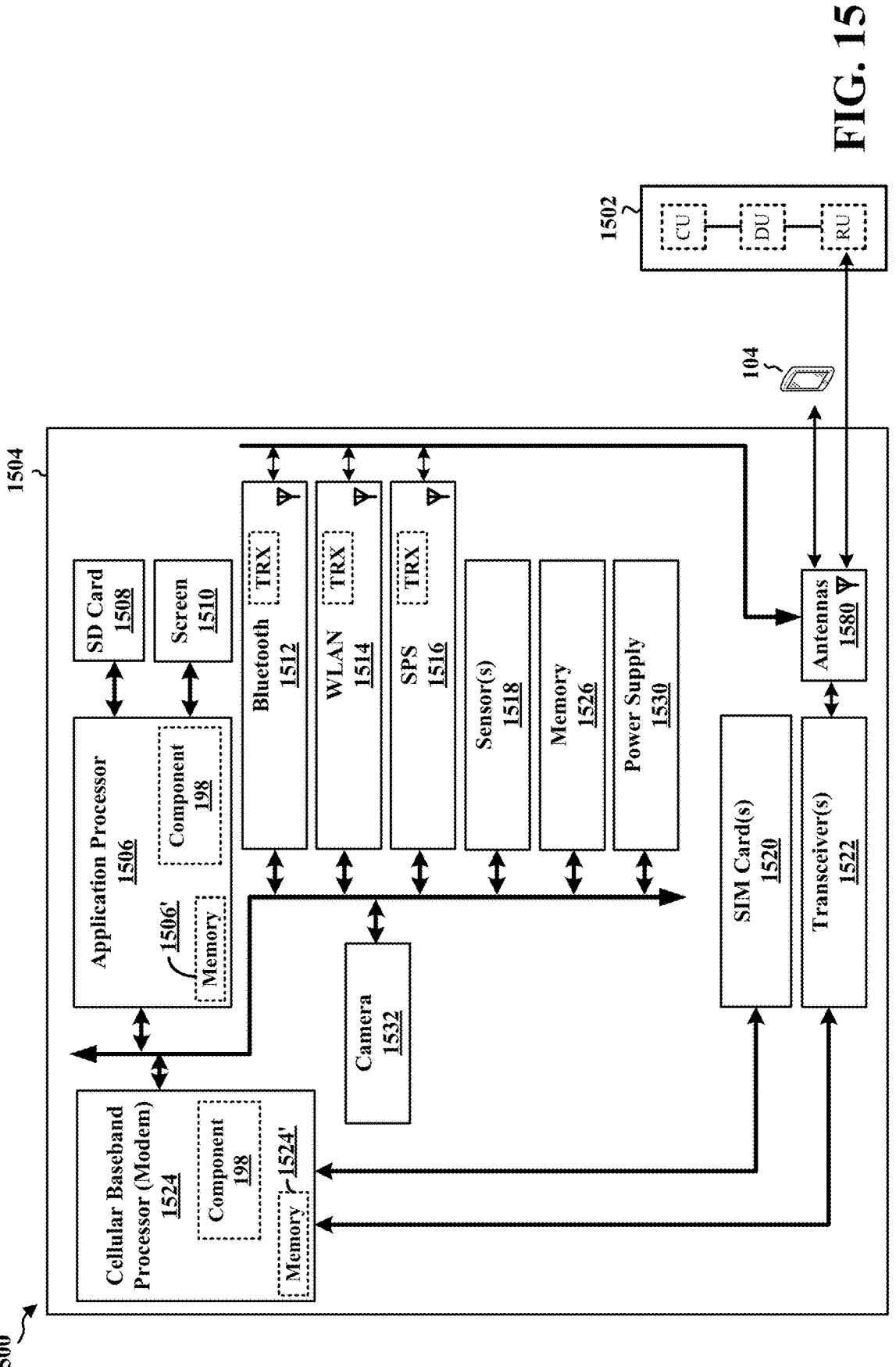
FIG. 15 is a diagram illustrating an example of a hardware implementation for an example apparatus and/or network entity.

FIG. 15 is a diagram 1500 illustrating an example of a hardware implementation for an apparatus 1504. The apparatus 1504 may be a UE, a component of a UE, or may implement UE functionality. In some aspects, the apparatus 1504 may include a cellular baseband processor 1524 (also referred to as a modem) coupled to one or more transceivers 1522 (e.g., cellular RF transceiver). The cellular baseband processor 1524 may include on-chip memory 1524'. In some aspects, the apparatus 1504 may further include one or more subscriber identity modules (SIM) cards 1520 and an application processor 1506 coupled to a secure digital (SD) card 1508 and a screen 1510. The application processor 1506 may include on-chip memory 1506'. In some aspects, the apparatus 1504 may further include a Bluetooth module 1512, a WLAN module 1514, an SPS module 1516 (e.g., GNSS module), one or more sensor modules 1518 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1526, a power supply 1530, and/or a camera 1532. The Bluetooth module 1512, the WLAN module 1514, and the SPS module 1516 may include an on-chip transceiver (TRX) (or in some cases, just a receiver (RX)). The Bluetooth module 1512, the WLAN module 1514, and the SPS module 1516 may include their own dedicated antennas and/or utilize the antennas 1580 for communication. The cellular baseband processor 1524 communicates through the transceiver(s) 1522 via one or more antennas 1580 with the UE 104 and/or with an RU associated with a network entity 1502. The cellular baseband processor 1524 and the application processor 1506 may each include a computer-readable medium/memory 1524', 1506', respectively. The additional memory modules 1526 may also be considered a computer-readable medium/memory. Each computer-readable medium/memory 1524', 1506', 1526 may be non-transitory. The cellular baseband processor 1524 and the application processor 1506 are each responsible for general processing, including the execution of software stored on the computer-readable medium/memory. The software, when executed by the cellular baseband processor 1524/application processor 1506, causes the cellular baseband processor 1524/application processor 1506 to perform the various functions described supra. The computer-readable medium/memory may also be used for storing data that is manipulated by the cellular baseband processor 1524/application processor 1506 when executing software. The cellular baseband processor 1524/application processor 1506 may be a component of the UE 350 and may include the memory 360 and/or at least one of the TX processor 368, the RX processor 356, and the controller/processor 359. In one configuration, the apparatus 1504 may be a processor chip (modem and/or application) and include just the cellular baseband processor 1524 and/or the application processor 1506, and in another configuration, the apparatus 1504 may be the entire UE (e.g., see UE 350 of FIG. 3) and include the additional modules of the apparatus 1504.

As discussed supra, the component 198 may be configured to measure, during a predetermined time window via a power detector of the UE, a power of a transmission channel for communication between the UE and a network entity; and monitor, based on the power of the transmission channel, for a WUS using a WUR or an MR of the UE. The component 198 may be further configured to perform any of the aspects described in connection with the flowcharts in FIG. 11 and FIG. 12, and/or performed by the UE 1002 in FIG. 10. The component 198 may be within the cellular baseband processor 1524, the application processor 1506, or both the cellular baseband processor 1524 and the application processor 1506. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1504 may include a variety of components configured for various functions. In one configuration, the apparatus 1504, and in particular the cellular baseband processor 1524 and/or the application processor 1506, includes means for measuring, during a predetermined time window via a power detector of the UE, a power of a transmission channel for communication between the UE and a network entity, and means for monitoring, based on the power of the transmission channel, for a WUS using a WUR or an MR of the UE. The apparatus 1504 may further include means for performing any of the aspects described in connection with the flowcharts in FIG. 11 and FIG. 12, and/or aspects performed by the UE 1002 in FIG. 10. The means may be the component 198 of the apparatus 1504 configured to perform the functions recited by the means. As described supra, the apparatus 1504 may include the TX processor 368, the RX processor 356, and the controller/processor 359. As such, in one configuration, the means may be the TX processor 368, the RX processor 356, and/or the controller/processor 359 configured to perform the functions recited by the means.

Figure 16:
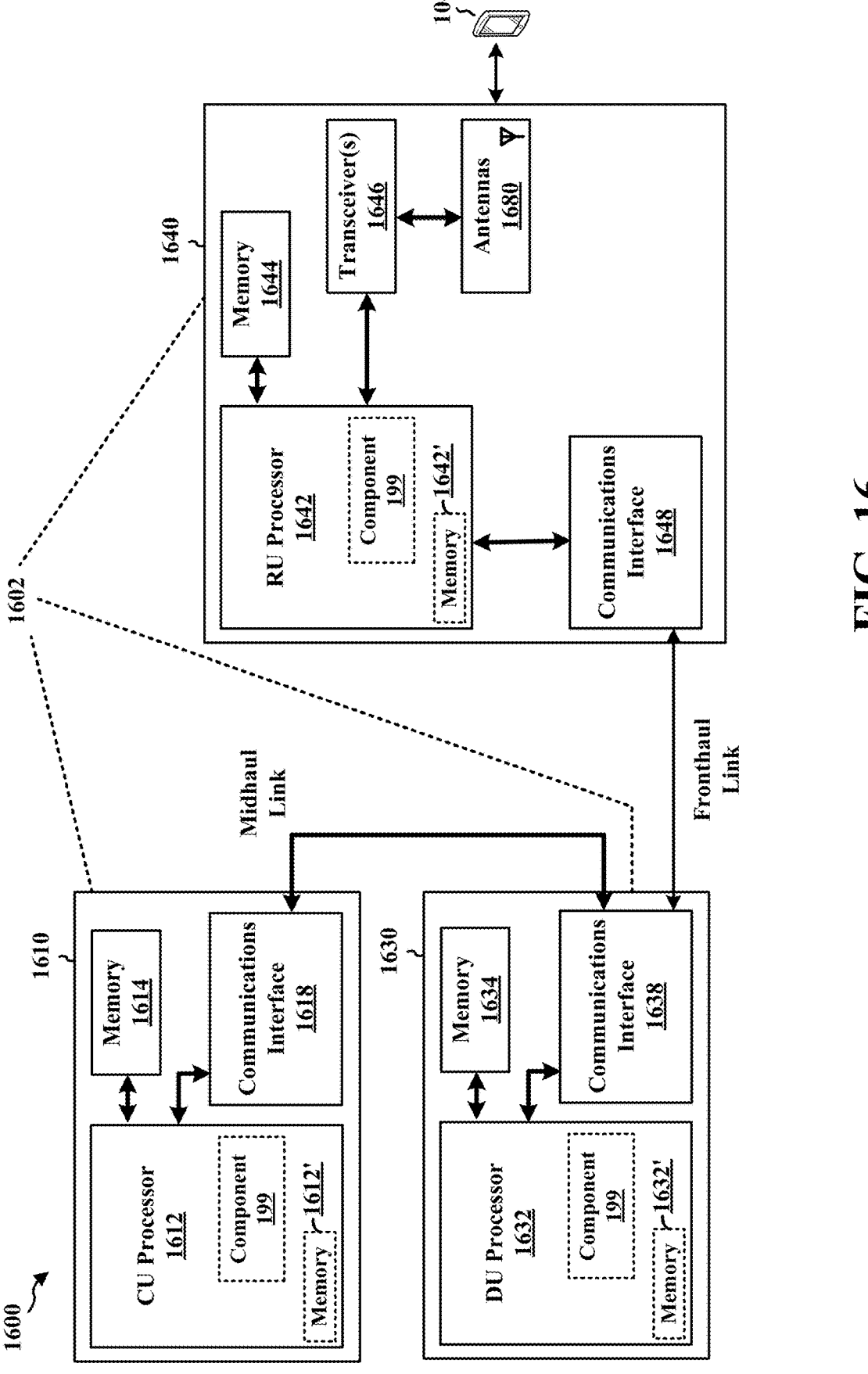
FIG. 16 is a diagram illustrating an example of a hardware implementation for an example network entity.

FIG. 16 is a diagram 1600 illustrating an example of a hardware implementation for a network entity 1602. The network entity 1602 may be a BS, a component of a BS, or may implement BS functionality. The network entity 1602 may include at least one of a CU 1610, a DU 1630, or an RU 1640. For example, depending on the layer functionality handled by the component 199, the network entity 1602 may include the CU 1610; both the CU 1610 and the DU 1630; each of the CU 1610, the DU 1630, and the RU 1640; the DU 1630; both the DU 1630 and the RU 1640; or the RU 1640. The CU 1610 may include a CU processor 1612. The CU processor 1612 may include on-chip memory 1612'. In some aspects, the CU 1610 may further include additional memory modules 1614 and a communications interface 1618. The CU 1610 communicates with the DU 1630 through a midhaul link, such as an F1 interface. The DU 1630 may include a DU processor 1632. The DU processor 1632 may include on-chip memory 1632'. In some aspects, the DU 1630 may further include additional memory modules 1634 and a communications interface 1638. The DU 1630 communicates with the RU 1640 through a fronthaul link. The RU 1640 may include an RU processor 1642. The RU processor 1642 may include on-chip memory 1642'. In some aspects, the RU 1640 may further include additional memory modules 1644, one or more transceivers 1646, antennas 1680, and a communications interface 1648. The RU 1640 communicates with the UE 104. The on-chip memory 1612', 1632', 1642' and the additional memory modules 1614, 1634, 1644 may each be considered a computer-readable medium/memory. Each computer-readable medium/memory may be non-transitory. Each of the processors 1612, 1632, 1642 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 may be configured to receive, from a UE, a sensing capability for measuring, during a predetermined time window, a power of a transmission channel for communication between the UE and the network entity; and transmit, for the UE, a WUS based on the power of the transmission channel, where the WUS is associated with a WUR or an MR of the UE. The component 199 may be further configured to perform any of the aspects described in connection with the flowcharts in FIG. 13 and FIG. 14, and/or performed by the base station 1004 in FIG. 10. The component 199 may be within one or more processors of one or more of the CU 1610, DU 1630, and the RU 1640. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1602 may include a variety of components configured for various functions. In one configuration, the network entity 1602 includes means for receiving, from a UE, a sensing capability for measuring, during a predetermined time window, a power of a transmission channel for communication between the UE and the network entity, and means for transmitting, for the UE, a WUS based on the power of the transmission channel, where the WUS is associated with a WUR or an MR of the UE. The network entity 1602 may further include means for performing any of the aspects described in connection with the flowcharts in FIG. 13 and FIG. 14, and/or aspects performed by the base station 1004 in FIG. 10. The means may be the component 199 of the network entity 1602 configured to perform the functions recited by the means. As described supra, the network entity 1602 may include the TX processor 316, the RX processor 370, and the controller/processor 375. As such, in one configuration, the means may be the TX processor 316, the RX processor 370, and/or the controller/processor 375 configured to perform the functions recited by the means.

This disclosure provides a method for wireless communication at a UE. The method may include measuring, during a predetermined time window via a power detector of the UE, a power of a transmission channel for communication between the UE and a network entity; and monitoring, based on the power of the transmission channel, for a WUS using a WUR or an MR of the UE. The method enables a UE to sense the power level associated with a WUS using a power detector, and use a radio that adapts better to the perceived power level (e.g., the WUR or the MR) to monitor for the WUS. The method improves the blocker robustness for WUS sensing without sacrificing power efficiency. Thus, it improves the power consumption efficiency of wireless communication.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X. X would include one or more elements. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a UE. The method may include measuring, during a predetermined time window via a power detector of the UE, a power of a transmission channel for communication between the UE and a network entity; and monitoring, based on the power of the transmission channel, for a WUS using a WUR or an MR of the UE.

Aspect 2 is the method of aspect 1, where the method may further include receiving, from the network entity, a BW for measuring the power of the transmission channel, and where measuring the power of the transmission channel may include: measuring the power of the transmission channel based on the BW.

Aspect 3 is the method of any of aspects 1 to 2, where the method may further include: receiving, from the network entity, an indication of the predetermined time window prior to being configured to measure the power of the transmission channel.

Aspect 4 is the method of any of aspects 1 to 3, where the method may further include: transmitting, for the network entity, a sensing capability for measuring the power of the transmission channel prior to being configured to measure the power of the transmission channel.

Aspect 5 is the method of aspect 4, where monitoring for the WUS using the WUR or the MR of the UE may include: monitoring, in response to the power of the transmission channel being greater than a power threshold, for the WUS using the MR; or monitoring, in response to the power of the transmission channel being less than or equal to the power threshold, for the WUS using the WUR.

Aspect 6 is the method of any of aspects 4 to 5, where the WUS may include a preamble, and where monitoring for the WUS may include: monitoring for the WUS based on the preamble.

Aspect 7 is the method of aspect 6, where the method may further include: receiving, from the network entity, an indication of a set of preamble properties for the preamble. The set of preamble properties may include one or more of: a length of the preamble, a preamble power of the preamble, a periodicity of the preamble, or a preamble bandwidth for the preamble.

Aspect 8 is the method of any of aspects 6 to 7, where monitoring for the WUS using the WUR or the MR may include: monitoring, in response to the SNR of the transmission channel being unknown or less than a quality threshold, for the WUS using the WUR or the MR based on the preamble.

Aspect 9 is the method of aspect 8, where monitoring for the WUS using the WUR or the MR based on the preamble may further include: monitoring, in response to the preamble indicating the power of the transmission channel is greater than a power threshold, for the WUS using the MR; or monitoring, in response to the preamble indicating the power of the transmission channel is less than or equal to the power threshold, for the WUS using the WUR.

Aspect 10 is the method of any of aspects 8 to 9, where monitoring for the WUS using the WUR or the MR may include: monitoring, in response to the SNR of the transmission channel being greater than the quality threshold, for the WUS using the WUR or the MR based on whether the preamble is detected.

Aspect 11 is the method of aspect 10, where monitoring for the WUS using the WUR or the MR based on whether the preamble is detected may include: monitoring, in response to the preamble being detected and the power of the transmission channel being greater than a power threshold, for the WUS using the MR or the WUR; monitoring, in response to the preamble being detected and the power of the transmission channel being less than or equal to the power threshold, for the WUS using the WUR; and operating, in response to the preamble not being detected, the WUR and the MR according to a predetermined rule.

Aspect 12 is the method of aspect 11, where the method may further include: receiving, from the network entity, an indication of the predetermined rule.

Aspect 13 is the method of aspect 12, where operating the WUR and the MR according to the predetermined rule may include: maintaining, in response to the preamble not being detected, a sleep state without waking up the WUR or the MR.

Aspect 14 is the method of any of aspects 11 to 13, where monitoring for the WUS using the WUR or the MR based on whether the preamble is detected may further include: periodically waking up the WUR according to a wake-up periodicity, where the wake-up periodicity is based on a determination by the network entity or the UE; and monitoring for the WUS based on periodically waking up the WUR.

Aspect 15 is an apparatus for wireless communication at a UE, including: a memory; and at least one processor coupled to the memory and, based at least in part on information stored in the memory, the at least one processor is configured to perform the method of any of aspects 1-14.

Aspect 16 is the apparatus of aspect 15, further including at least one of a transceiver or an antenna coupled to the at least one processor and configured to receive the BW for measuring the power of the transmission channel.

Aspect 17 is an apparatus for wireless communication including means for implementing the method of any of aspects 1-14.

Aspect 18 is a computer-readable medium (e.g., a non-transitory computer-readable medium) storing computer executable code, where the code when executed by a processor causes the processor to implement the method of any of aspects 1-14.

Aspect 19 is a method of wireless communication at a network entity. The method may include receiving, from a UE, a sensing capability for measuring, during a predetermined time window, a power of a transmission channel for communication between the UE and the network entity; and transmitting, for the UE, a WUS based on the power of the transmission channel. The WUS may be associated with a WUR or an MR of the UE.

Aspect 20 is the method of aspect 19, where the method may further include transmitting, for the UE, a BW for the UE to measure the power of the transmission channel.

Aspect 21 is the method of any of aspects 19 to 20, where the method may further include: transmitting, for the UE, an indication of the predetermined time window prior to transmitting the WUS.

Aspect 22 is the method of any of aspects 19 to 21, where the method may further include configuring, in response to the power of the transmission channel being greater than a power threshold, the UE to monitor for the WUS using the MR; or configuring, in response to the power of the transmission channel being less than or equal to the power threshold, the UE to monitor for the WUS using the WUR.

Aspect 23 is the method of any of aspects 19 to 22, where the method may further include: assigning a preamble for the WUS; and configuring the UE to measure the power of the transmission channel based on the preamble for the WUS.

Aspect 24 is the method of aspect 23, where the method may further include: transmitting, for the UE, an indication of a set of preamble properties for the preamble. The set of preamble properties may include one or more of: a length of the preamble, a preamble power of the preamble, a periodicity of the preamble, or a preamble bandwidth for the preamble.

Aspect 25 is the method of any of aspects 23 to 24, where the method may further include configuring, in response to the SNR of the transmission channel being unknown or less than a quality threshold, the UE to monitor for the WUS using the WUR or the MR based on the preamble.

Aspect 26 is the method of aspect 25, where the method may further include configuring, in response to the preamble indicating the power of the transmission channel is greater than a power threshold, the UE to monitor for the WUS using the MR; or configuring, in response to the preamble indicating the power of the transmission channel is less than or equal to the power threshold, the UE to monitor for the WUS using the WUR.

Aspect 27 is the method of any of aspects 25 to 26, where the method may further include: configuring, in response to the SNR of the transmission channel being greater than the quality threshold, the UE to monitor for the WUS using the WUR or the MR based on whether the preamble is detected.

Aspect 28 is the method of aspect 27, where configuring the UE to monitor for the WUS using the WUR or the MR based on whether the preamble is detected may include: configuring, in response to the preamble being detected and the power of the transmission channel being greater than a power threshold, the UE to monitor for the WUS using the WUR or the MR; configuring, in response to the preamble being detected and the power of the transmission channel being less than or equal to the power threshold, the UE to monitor for the WUS using the WUR; and configuring, in response to the preamble not being detected, the UE to operate the WUR and the MR according to a predetermined rule.

Aspect 29 is the method of aspect 28, where the method may further include transmitting, for the UE, an indication of the predetermined rule.

Aspect 30 is the method of aspect 29, where configuring the UE to operate the WUR and the MR according to the predetermined rule may include: configuring, in response to the preamble not being detected, the UE to maintain a sleep state without waking up the WUR or the MR.

Aspect 31 is the method of any of aspects 28 to 30, where configuring the UE to monitor for the WUS using the WUR or the MR based on whether the preamble is detected may include: configuring the UE to periodically wake up the WUR to monitor for the WUS according to a wake-up periodicity. The wake-up periodicity may be based on a determination by the network entity or the UE.

Aspect 32 is an apparatus for wireless communication at a network entity, including: a memory; and at least one processor coupled to the memory and, based at least in part on information stored in the memory, the at least one processor is configured to perform the method of any of aspects 19-31.

Aspect 33 is the apparatus of aspect 32, further including at least one of a transceiver or an antenna coupled to the at least one processor and configured to receive the sensing capability for measuring the power of the transmission channel from the UE.

Aspect 34 is an apparatus for wireless communication including means for implementing the method of any of aspects 19-31.

Aspect 35 is a computer-readable medium (e.g., a non-transitory computer-readable medium) storing computer executable code, where the code when executed by a processor causes the processor to implement the method of any of aspects 19-31.

What is claimed is:

1. An apparatus for wireless communication at a user equipment (UE), comprising:
   memory; and
   at least one processor coupled to the memory and, based at least in part on information stored in the memory, the at least one processor is configured to:
   measure, during a predetermined time window via a power detector of the UE, a power of a transmission channel for communication between the UE and a network entity; and
   monitor, in response to a signal-to-noise ratio (SNR) of the transmission channel being greater than a quality threshold and based on a comparison of the power of the transmission channel with a power threshold, for a wake-up signal (WUS) using a wake-up radio (WUR) or a main radio (MR) of the UE further based on whether a preamble is detected in the WUS.

2. The apparatus of claim 1, wherein the at least one processor is further configured to:
   receive, from the network entity, a bandwidth (BW) for measuring the power of the transmission channel, and wherein, to measure the power of the transmission channel, the at least one processor is configured to:
   measure the power of the transmission channel based on the BW.

3. The apparatus of claim 2, further comprising:
   a transceiver coupled to the at least one processor, wherein, to receive the BW for measuring the power of the transmission channel, the at least one processor is configured to receive the BW via the transceiver, and wherein the at least one processor is further configured to:

receive, from the network entity, an indication of the predetermined time window prior to being configured to measure the power of the transmission channel.

4. The apparatus of claim 1, wherein the at least one processor is further configured to:

transmit, for the network entity, a sensing capability for measuring the power of the transmission channel prior to being configured to measure the power of the transmission channel.

5. The apparatus of claim 4, wherein, to monitor for the WUS using the WUR or the MR of the UE, the at least one processor is configured to:

monitor, in response to the power of the transmission channel being greater than the power threshold, for the WUS using the MR; or monitor, in response to the power of the transmission channel being less than or equal to the power threshold, for the WUS using the WUR.

6. The apparatus of claim 4, wherein the WUS includes the preamble, and wherein, to monitor for the WUS, the at least one processor is configured to:

monitor for the WUS based on the preamble.

7. The apparatus of claim 6, wherein the at least one processor is further configured to:

receive, from the network entity, an indication of a set of preamble properties for the preamble, wherein the set of preamble properties comprises one or more of:

a length of the preamble, a preamble power for the preamble, a preamble periodicity for the preamble, or a preamble bandwidth for the preamble.

8. The apparatus of claim 6, wherein, to monitor for the WUS using the WUR or the MR, the at least one processor is configured to:

monitor, in response to the SNR of the transmission channel being unknown or less than the quality threshold, for the WUS using the WUR or the MR based on the preamble.

9. The apparatus of claim 8, wherein, to monitor for the WUS using the WUR or the MR based on the preamble, the at least one processor is further configured to:

monitor, in response to the preamble indicating the power of the transmission channel is greater than the power threshold, for the WUS using the MR; or monitor, in response to the preamble indicating the power of the transmission channel is less than or equal to the power threshold, for the WUS using the WUR.

10. The apparatus of claim 1, wherein, to monitor for the WUS using the WUR or the MR based on whether the preamble is detected in the WUS, the at least one processor is further configured to:

monitor, in response to the preamble being detected and the power of the transmission channel being greater than the power threshold, for the WUS using the MR or the WUR;

monitor, in response to the preamble being detected and the power of the transmission channel being less than or equal to the power threshold, for the WUS using the WUR; and operate, in response to the preamble not being detected, the WUR and the MR according to a predetermined rule.

11. The apparatus of claim 10, wherein the at least one processor is further configured to:

receive, from the network entity, an indication of the predetermined rule.

12. The apparatus of claim 11, wherein, to operate the WUR and the MR according to the predetermined rule, the at least one processor is configured to:

maintain, in response to the preamble not being detected, a sleep state without waking up the WUR or the MR.

13. The apparatus of claim 10, wherein, to monitor for the WUS using the WUR or the MR based on whether the preamble is detected, the at least one processor is further configured to:

periodically wake up the WUR according to a wake-up periodicity, wherein the wake-up periodicity is based on a determination by the network entity or the UE; and monitor for the WUS based on periodically waking up the WUR.

14. An apparatus for wireless communication at a network entity, comprising:

memory; and at least one processor coupled to the memory and, based at least in part on information stored in the memory, the at least one processor is configured to:

receive, from a user equipment (UE), a sensing capability for measuring, during a predetermined time window, a power of a transmission channel for communication between the UE and the network entity;

transmit, for the UE, a wake-up signal (WUS) based on a comparison of the power of the transmission channel with a power threshold, wherein the WUS is associated with a wake-up radio (WUR) or a main radio (MR) of the UE; and configure, in response to a signal-to-noise ratio (SNR) of the transmission channel being greater than a quality threshold, the UE to monitor for the WUS using the WUR or the MR based on whether a preamble is detected in the WUS.

15. The apparatus of claim 14, further comprising a transceiver coupled to the at least one processor, wherein, to receive the sensing capability, the at least one processor is configured to receive the sensing capability via the transceiver, and wherein the at least one processor is further configured to:

transmit, for the UE, a bandwidth (BW) for the UE to measure the power of the transmission channel.

16. The apparatus of claim 15, wherein the at least one processor is further configured to:

transmit, for the UE, an indication of the predetermined time window prior to being configured to transmit the WUS.

17. The apparatus of claim 15, wherein the at least one processor is further configured to:

configure, in response to the power of the transmission channel being greater than the power threshold, the UE to monitor for the WUS using the MR; or configure, in response to the power of the transmission channel being less than or equal to the power threshold, the UE to monitor for the WUS using the WUR.

18. The apparatus of claim 15, wherein the at least one processor is further configured to:

assign the preamble for the WUS; and configure the UE to measure the power of the transmission channel based on the preamble for the WUS.

19. The apparatus of claim 18, wherein the at least one processor is further configured to:

transmit, for the UE, an indication of a set of preamble properties for the preamble, wherein the set of preamble properties comprises one or more of:

a length of the preamble, a preamble power for the preamble, a preamble periodicity for the preamble, or a preamble bandwidth for the preamble.

20. The apparatus of claim 18, wherein the at least one processor is further configured to:

configure, in response to the SNR of the transmission channel being unknown or less than the quality threshold, the UE to monitor for the WUS using the WUR or the MR based on the preamble.

21. The apparatus of claim 20, wherein the at least one processor is further configured to:

configure, in response to the preamble indicating the power of the transmission channel is greater than the power threshold, the UE to monitor for the WUS using the MR; or configure, in response to the preamble indicating the power of the transmission channel is less than or equal to the power threshold, the UE to monitor for the WUS using the WUR.

22. The apparatus of claim 14, wherein, to configure the UE to monitor for the WUS using the WUR or the MR based on whether the preamble is detected, the at least one processor is configured to:

configure, in response to the preamble being detected and the power of the transmission channel being greater than the power threshold, the UE to monitor for the WUS using the WUR or the MR;

configure, in response to the preamble being detected and the power of the transmission channel being less than or equal to the power threshold, the UE to monitor for the WUS using the WUR; and configure, in response to the preamble not being detected, the UE to operate the WUR and the MR according to a predetermined rule.

23. The apparatus of claim 22, wherein the at least one processor is further configured to:

transmit, for the UE, an indication of the predetermined rule.

24. The apparatus of claim 23, wherein, to configure the UE to operate the WUR and the MR according to the predetermined rule, the at least one processor is further configured to:

configure, in response to the preamble not being detected, the UE to maintain a sleep state without waking up the WUR or the MR.

25. The apparatus of claim 22, wherein, to configure the UE to monitor for the WUS using the WUR or the MR based on whether the preamble is detected, the at least one processor is further configured to:

configure the UE to periodically wake up the WUR to monitor for the WUS according to a wake-up periodicity, wherein the wake-up periodicity is based on a determination by the network entity or the UE.

26. A method of wireless communication at a user equipment (UE), comprising:

measuring, during a predetermined time window via a power detector of the UE, a power of a transmission channel for communication between the UE and a network entity; and monitoring, in response to a signal-to-noise ratio (SNR) of the transmission channel being greater than a quality threshold and based on a comparison of the power of the transmission channel with a power threshold, for a wake-up signal (WUS) using a wake-up radio (WUR) or a main radio (MR) of the UE further based on whether a preamble is detected in the WUS.

27. The method of claim 26, further comprising:

receiving, from the network entity, a bandwidth (BW) for measuring the power of the transmission channel, and wherein measuring the power of the transmission channel comprises:

measuring the power of the transmission channel based on the BW.

28. A method of wireless communication at a network entity, comprising:

receiving, from a user equipment (UE), a sensing capability for measuring, during a predetermined time window, a power of a transmission channel for communication between the UE and the network entity;

transmitting, for the UE, a wake-up signal (WUS) based on a comparison of the power of the transmission channel with a power threshold, wherein the WUS is associated with a wake-up radio (WUR) or a main radio (MR) of the UE; and configuring, in response to a signal-to-noise ratio (SNR) of the transmission channel being greater than a quality threshold, the UE to monitor for the WUS using the WUR or the MR based on whether a preamble is detected in the WUS.

* * * * *